US010366455B2

(12) United States Patent
Birkhead et al.

(10) Patent No.: US 10,366,455 B2
(45) Date of Patent: Jul. 30, 2019

(54) SYSTEMS AND METHODS FOR MANAGING PORTFOLIO-RELEVANT NEWS CONTENT

(71) Applicant: Scottrade, Inc., St. Louis, MO (US)

(72) Inventors: Jessica Lynn Inman Birkhead, St. Louis, MO (US); Daniel Edward Dean, Lake Saint Louis, MO (US); Christopher Nathan Melnick, St. Charles, MO (US); Murat Sanli, Kirkwood, MO (US); Andrew Joseph Stafford, St. Charles, MO (US); Justin R. Romo, Brentwood, MO (US); Virgil Michael Scott, Lake St. Louis, MO (US); Oscar Javier Pineda-Madrid, II, St. Charles, MO (US)

(73) Assignee: Scottrade, Inc., St. Louis, MO (US)

(*) Notice: Subject to any disclaimer, the term of this patent is extended or adjusted under 35 U.S.C. 154(b) by 598 days.

(21) Appl. No.: 14/596,031

(22) Filed: Jan. 13, 2015

(65) Prior Publication Data
US 2015/0199763 A1 Jul. 16, 2015

Related U.S. Application Data

(60) Provisional application No. 61/926,738, filed on Jan. 13, 2014.

(51) Int. Cl.
*G06Q 40/06* (2012.01)
(52) U.S. Cl.
CPC .................................. *G06Q 40/06* (2013.01)

(58) Field of Classification Search
CPC ........ G06Q 40/06; G06Q 40/00; G06Q 30/02; G06Q 10/00; Y10S 707/99934;
(Continued)

(56) References Cited

U.S. PATENT DOCUMENTS 5,907,838 A * 5/1999 Miyasaka ........... G06F 17/3066
707/740
8,027,893 B1 9/2011 Burrows et al.
(Continued)

OTHER PUBLICATIONS

Ben Schneiderman, Discovering Business Intelligence Using Treemap Visualizations, Business Intelligence Network, Apr. 11, 2006. (Year: 2006).*

*Primary Examiner* — Namrata Boveja
*Assistant Examiner* — Carol A See
(74) *Attorney, Agent, or Firm* — Harness, Dickey & Pierce, P.L.C.

(57) ABSTRACT

A computer-implemented method for managing portfolio-relevant content is implemented by a content management computer system coupled to a memory. The method includes receiving a set of assets associated with an investor account, transmitting an investment content request for an investment content associated with at least one asset of the set of assets, receiving the investment content including a plurality of investment content items, determining a plurality of content indicators associated with each investment content item, determining a set of relevant investment content including a plurality of display parameters based at least partially on at least a portion of the investment content and at least a portion of the set of assets, and providing the set of relevant investment content for display on a user device based on at least a portion of the display parameters.

19 Claims, 19 Drawing Sheets

(58) Field of Classification Search
CPC ......... G06F 17/30696; G06F 17/30867; G06F 17/30864; G06F 17/3053; G06F 17/30991; G06F 17/30554; G06F 17/30572; G06F 17/2247; G06F 3/04817; G06F 3/048

See application file for complete search history.

(56) References Cited

U.S. PATENT DOCUMENTS

| | | |
|---|---|---|
| 8,315,932 B2 | 11/2012 | Burrows et al. |
| 8,458,065 B1 | 6/2013 | Zhang et al. |
| 8,671,070 B1 | 3/2014 | Voutour |
| 8,671,140 B2 | 3/2014 | Lunenfeld |
| 8,781,945 B2 | 7/2014 | Preston et al. |
| 8,832,186 B2 | 9/2014 | Lunenfeld |
| 2002/0174043 A1* | 11/2002 | Gilbert .................. G06Q 40/00 705/35 |
| 2004/0168115 A1* | 8/2004 | Bauernschmidt ... G06F 17/2241 715/238 |
| 2005/0071217 A1 | 3/2005 | Hoogs et al. |
| 2006/0247989 A1 | 11/2006 | Olson |
| 2007/0203720 A1* | 8/2007 | Singh .................... G06Q 10/00 705/7.11 |
| 2009/0024538 A1 | 1/2009 | Joo |
| 2010/0332414 A1* | 12/2010 | Mead .................... G06Q 40/06 705/36 R |
| 2011/0131076 A1 | 6/2011 | Leidner et al. |
| 2012/0233089 A1* | 9/2012 | Calman ................. G06Q 40/00 705/36 R |
| 2012/0259826 A1* | 10/2012 | Zalila-Wenkstern ........ G06F 16/954 707/706 |
| 2013/0138577 A1 | 5/2013 | Sisk |
| 2014/0330752 A1 | 11/2014 | Preston et al. |

* cited by examiner

THE LAUNCHING PAD TRADING CO.

Home / Gallery / News Visualization

News Visualization

| News for | Sort By | Time Range |
|---|---|---|
| Positions ▼ | Most Recent News ▼ | Weekly ▼ |

| CLO | GOP | FLH | AEW | TKQ | MJR | SCA | PLC | GZO |
|---|---|---|---|---|---|---|---|---|
| | | | | MSFT | | | | VKY |
| | | | | | KDT | OGW | BHZ | LDO | FHP |

Most Recent — Older — None 69 stories for all positions during Dec. 24th 2013 at 12:17 pm – Dec. 31st 2013 at 12:17 pm

STK1 to present at BANK Conference
3 hours ago (December 31, 2013 at 5:07 am) Newswire Service A
Amsterdam-Newswire Service A-December 31, 2013 Acme Holding (NYSE: STK1), a leading Japanese provider of carrier-neutral colocation data center services announced today that COO Don Paris is scheduled to speak in Singapore

The A Analyst Blog Highlights : Blue Stocking, Mingo Technologies, Terrasub and Awe Technology Group
4 hours ago (December 31, 2013 at 8:30 am) Newswire Service A
CHICAGO, Dec. 13, 2013 – A Analyst.com announces the list of stocks featured in the A Analyst Blog Every day the A Analyst analysts discuss the latest news and events impacting stocks and the financial markets. Stocks...

Press Release: Healthcare A Completes Vital Signs Acquisition in Australia, New Zealand
5 hours ago (December 31, 2013 at 7:30 am) Newswire Service A
Healthcare A Completes Vital Signs Acquisitions in Australia, Asiamakes An Industry Leader in Specialty Consumer Products, NewsService C TOKYO Dec 31 2013

Dr. Adam Smith Praised by Patients on Network 1 News' Social Media Site
6 hours ago (December 31, 2013 at 6:00 am) Newswire Service A
Dr. Adam Smith Praised by Patients on Network 1 News' Social Media Site, AKRON, OH -(Newswire Service B – Dec. 31, 2013)-
In an interview with the European newspaper NEWS ONE former recording artist Mary Loud confesses going to change...

Quince Feud Deepens With Court-Appointed Monitor
7 hours ago (December 31, 2013 at 5:28 am) Newswire Service D
A feud between Quince, Inc. and a lawyer appointed by a federal court judge to monitor the company's data service pricing....

THE LAUNCHING PAD TRADING CO.

[🏠] | About Us | Gallery | Welcome, User

Home / Gallery / News Visualization

News Visualization

| News for | Sort By | Time Range |
|---|---|---|
| Positions ▼ | Most Recent News ▼ | Weekly ▼ | Most Re |

| CLO | GOP | FLH | AEW |

69 stories for all positions during Dec. 24th 2013 at 12:17 pm

STK1 to present at BANK Conference
3 hours ago (December 31, 2013 at 5:07 am) Newswire Service A
Amsterdam-Newswire Service A-December 31, 2013 Acme Holding
colocation data center services announced today that COO Don

The A Analyst Blog Highlights: Blue Stocking, Mi
4 hours ago (December 31, 2013 at 8:30 am) Newswi ervice A
CHICAGO, Dec. 13, 2013 – A Analyst.com announces the list of st
analysts discuss the latest news and events impacting stocks and t

Press Release: Healthcare A Completes Vital Signs Ac
5 hours ago (December 31, 2013 at 7:30 am) Newswire Service A
Healthcare A Completes Vital Signs Acquisitions in Australia, Asian
NewsService C TOKYO Dec 31 2013

Dr. Adam Smith Praised by Patients on Network 1 New
6 hours ago (December 31, 2013 at 6:00 am) Newswire Service A
Dr. Adam Smith Praised by Patients on Network 1 News' Social Me
In an interview with the European newspaper NEWS ONE former re

Quince Feud Deepens With Court-Appointed Monitor
7 hours ago (December 31, 2013 at 5:28 am) Newswire Service D
A feud between Quince, Inc. and a lawyer appointed by a federal co

---

The A Analyst Blog HighlightsBlue Stocking Mingo Technologies Terrasub and Awe Technology Group
4 hours ago | Newswire Service A Press Release Wire CHICAGO, Dec. 13, 2013 /PRNewswire/ -- A Analyst.com announces the list of stocks featured in the A Analyst Blog. Every day the A Analyst Equity Research analysts discuss the latest news and events impacting stocks and the financial markets. Stocks recently featured in the blog include the <u>Blue Stocking, Inc.</u> (NYSE BST-Free Report), <u>Mingo Technologies Corp.</u> (Nasdaq MTC-Free Report), <u>Terrasub</u> (Nasdaq TSB-Free Report), and <u>Awe Technology Group</u> (Nasdaq ATG-Free Report).

(Photo: http://photos.prnewswire.com/prnh/20121022/AALOGO)

Today, A Analyst is promoting its "Buy" stock recommendations. Get #1 Stock of the Day pick for free.

Here are highlights from Monday's A Analyst Blog

Strong Buy on Blue Stocking

On Dec. 28, 2013 A Analyst's Investment Research upgraded Blue Stocking, Inc. (NYSE BST-Free Report) to an A Analyst's Rank #1 (Strong Buy). Long-term expected earnings growth rate of 19.1%, impressive third-quarter results and a positive estimate revision trend makes Blue Stocking an attractive investment opportunity.

Why the Upgrade?

Blue Stocking reported strong third-quarter results, beating the A Analyst's Consensus Estimate on both lines. Earnings jumped 45% from the year-ago quarter to 37 cents per share. Revenues increased 16% year over year to $450 million and were ahead of management's guided range of $395 million to $410.5 million.

The Launching Pad Trading Co.

🏠 About Us | Gallery

Welcome, User

Home / Gallery / News Visualization

News Visualization

| News for | Sort By | Time Range |
|---|---|---|
| Positions ▼ | Most Recent News ▼ | Weekly ▼ |

Most Recent — Older — None

| CLO | GOP | FLH | AEW | TKQ | MJR | SCA | PLC | GZO |
|---|---|---|---|---|---|---|---|---|
| | | | | MSFT | KDT | OGW | BHZ | VKY |
| | | | | | | | | LDO | FHP |

69 stories for all positions during Dec. 24th 2013 at 12:17 pm - Dec. 31st 2013 at 12:17 pm

STK1 to present at BANK Conference

3 hours ago (December 31, 2013 at 5:07 am) Newswire Service A

Amsterdam-Newswire Service A–December 31, 2013 Acme Holding (NYSE: STK1), a leading Japanese provider of carrier-neutral colocation data center services, announced today that COO Don Paris is scheduled to speak in Singapore...

The A Analyst Blog Highlights: Blue Stocking, Mingo Technologies, Terrasub and Awe Technology Group

4 hours ago (December 31, 2013 at 8:30 am) Newswire Service A

CHICAGO, Dec. 13, 2013 – A Analyst.com announces the list of stocks featured in the A Analyst Blog. Every day the A Analyst analysts discuss the latest news and events impacting stocks and the financial markets. Stocks...

Press Release: Healthcare A Completes Vital Signs Acquisition in Australia, New Zealand

5 hours ago (December 31, 2013 at 7:30 am) Newswire Service A

Healthcare A Completes Vital Signs Acquisitions in Australia, Asiamakes An Industry Leader in Specialty Consumer Products, NewsService C, TOKYO, Dec. 31, 2013

Dr. Adam Smith Praised by Patients on Network 1 News' Social Media Site

6 hours ago (December 31, 2013 at 6:00 am) Newswire Service A

Dr. Adam Smith Praised by Patients on Network 1 News' Social Media Site, AKRON, OH –(Newswire Service B – Dec. 31, 2013)- In an interview with the European newspaper NEWS ONE former recording artist Mary Loud confessed. "I am going to change....

317

| Quince Feud Deepens | Voluntary Field | New York Late Money | Finance Firm A Reaches |

```
TRADING CO.                                    Your last login was 12/22/2014 12:22:39 PM ET          [Log Off]
─────────────────────────────────────────────────────────────────────────────────────────────────────
Digital Solutions  | Home | Trade | My Account | Quotes & Research | Banking | Knowledge Center |  Detailed Quote: [      ] [Go]
─────────────────────────────────────────────────────────────────────────────────────────────────────
Balances
Positions                News Visualization                                                    Refresh       Print
Flexible Reinvestment
Portfolio Review         News for  ⊙ Lists ○ Symbol Search   Sort By            Time Range   Subject
Watch Lists              [Test              ▼] [Most Recent News ▼] [Weekly ▼] [Enter Subject]  Most Recent ▓▓▓ Older   None
News Visualization
(New)                    Displaying 20 most recently added symbols
Gain/Loss & Tax
Center                   ┌──────────┬──────────┬────────┐ ┌──────┬──────┬─────────┐
Account History          │          │          │        │ │ CMG  │      │ NFLX│VIPS│
Order Status             │    FB    │  TWTR    │        │ │──────│ TGT  │─────┤DDD │
Transfer Funds           │          │          │   VZ   │ │ YHOO │      │     ├────┤
Deposits (New)           │          ├──────────┤        │ ├──────┼──────┤     │XONE│
Withdrawals              │          │   CAT    │        │ │ WFM  │      │  S  ├────┤
My Information &         │          ├──────────┤        │ ├──────┤ TSLA │     │ ED │
Preferences              │          │  FNMA    │        │ │ CLF  │      │     │BIDU│
Alerts                   └──────────┴──────────┴────────┘ └──────┴──────┴─────────┘         [▦] [⊞]
──────────────────────
Quick Quote      □      165 stories for these symbols during Dec. 15th 2014 at 2:52 pm ET - Dec. 22nd 2014 at 3:02 pm ET
[Symbol or Name]
[Quote] [Research]      U.S. Stocks Trade Higher in Low Volume
Symbol Lookup           an hour ago (Dec.22nd 2014 at 2:08 pm ET)–Dow Jones Institutional News
Build an Option         U.S. stocks rose Monday for a fourth straight session after the Federal Reserve reiterated last week it would
                        be patient about raising interest rates.
DJIA SDJI +113.60
17,918.40    (0.64%)    HGTV's Stars to Celebrate New Year's Day with Fans During Live All-Day Twitter Party
NASDAQ $COMP            4 hours ago (Dec.22nd 2014 at 11:01 am ET)–Dow Jones Global Press Release Wire
4,774.22     +8.84
             (0.19%)    NEW YORK–(BUSINESS WIRE)–
S&P 500 $$PX            December 22,2014–New Year's Day at HGTV will be filled with series premieres and the big-
2,074.46     +3.81      gest social media ev...
             (0.18%)
NYSE $NYA               Caterpillar Celebrates 85 Years on the New York Stock Exchange
10,904.4673 +14.2273    5 hours ago (Dec.22nd 2014 at 10:01 am ET)–Dow Jones Global Press Release Wire
             (0.13%)    Caterpillar Chairman and CEO John Smith Rings Opening Bell NEW YORK, Dec 22,2014
                        /PRNewswire/–
Market Closes in:       Caterpillar, Inc. Chairman and CEO John Smith rang the opening bell today on the New York Stock...
1 hour 8 minutes
12/22/2014 2:52 PM ET   Critical Alerts For Invensense, FireEye, General Electric, Twitter and Celgene Released By InvestorsObser...
                        5 hours ago (Dec.22nd 2014 at 9:32 am ET)/PRNewswire/–InvestorsObserver issues critical Price Watch Alerts for INVN, FEYE, GE, TWTR and CELG. To see
                        CHICAGO, Dec. 22 2014/PRNewswire/–InvestorsObserver issues critical Price Watch Alerts for INVN, FEYE, GE, TWTR and CELG. To see
                        what our analysts have discovered about a particular stock...
                        The Zacks Analyst Blog Highlights: Google, T-Mobile, Verizon Communications and AT&T
```

TRADING CO.

Your last login was 12/22/2014 12:22:39 PM ET

| Home | Trade | My Account | Quotes & Research | Banking | Knowledge Center | Detailed Quote: [ ] Log Off [Go] |

Digital Solutions

News Visualization

Balances
Positions
Flexible Reinvestment
Portfolio Review
Watch Lists
News Visualization (New)
Gain/Loss & Tax Center
Account History
Order Status
Transfer Funds
Deposits (New)
Withdrawals
My Information & Preferences
Alerts News for ● Lists ○ Symbol Search    Sort By        Time Range   Subject                  Refresh   Older   None
                                    [Most Recent News ▼] [Weekly ▼] [Enter Subject]    Most Recent ▓▓▓▓▓
| Test | |
|---|---|
| TSLA | Tesla MOTORS, INC. | NASDAQ |
| TSO | TESORO CORPORATION | NYSE |
| AEHR | AEHR TEST SYSTEMS | NASDAQ |
| TSRA | TESERA TECH. INC. | NASDAQ |
| TSRO | TESARO, INC. | NASDAQ |
| TESO | TESCO CORPORATION | NASDAQ |
| TLLP | TESORO LOGISTICS LP | NYSE |
| TSCDV | TESCO PLC | |
| TXLZF | TESLA EXPLORATION | NASDAQ |
| TESS | TESCO TECH, INC. | NASDAQ |

|       |     | CMG |     |     | NFLX | VIPS / DDD |
|       | VZ  |     | TGT | YHOO |      | XONE       |
|       |     | WFM |     | TSLA | CLF  | S / BIDU / ED |

165 stories for these symbols during Dec. 15th 2014 at 2:52 pm ET - Dec. 22nd 2014 at 3:02 pm ET

| U.S. Stocks Trade Higher in Low Volume<br>an hour ago (Dec.22nd 2014 at 2:08 pm ET)<br>Dow Jones Institutional News<br><br>U.S. stocks rose Monday for a fourth straight session after the Federal Reserve reiterated last week it would be patient about raising interest rates. | HGTV's Stars to Celebrate New Year's Day with Fans During Live All-Day Twitter Party<br>4 hours ago (Dec.22nd 2014 at 11:01 am ET)<br>Dow Jones Global Press Release Wire<br><br>NEW YORK--(BUSINESS WIRE)--December 22,2014--New Year's Day at HGTV will be filled with series premieres and the biggest social media ev... | Moody's Upgrades To A3 Housing Authority Of The City Of North Charleston, Mulit-Family Housing Revenue Bonds (Horizon Village) Series 2006a<br>5 hours ago (Dec.22nd 2014 at 10:10 am ET)<br>Dow Jones Institutional News<br><br>The following is a press release from Moody's Upgrades To A3 Housing Authority Of The... | Caterpillar Celebrates 85 Years on the New York Stock Exchange<br>5 hours ago (Dec.22nd 2014 at 10:01 am ET)<br>Dow Jones Global Press Release Wire<br><br>Caterpillar Chairman and CEO John Smith Rings Opening Bell NEW YORK, Dec 22,2014<br>/PRNewswire/--<br>Caterpillar, Inc. Chairman and CEO John Smith rang the opening bell today on the New York Stock ... |

Quick Quote ☐
[Symbol or Name]
[Quote] [Research]
Symbol Lookup
Build an Option DJIA $DJI +113.60
17,918.40  (0.64%)
NASDAQ $COMP +8.84
4,774.22  (0.19%)
S&P 500 $$PX  +3.81
2,074.46  (0.18%)
NYSE $NYA +14.2273
10,904.4673  (0.13%)

Market Closes in:
1 hour 8 minutes
12/22/2014 2:52 PM ET

| Critical Alerts For Invensense, FireEye, General Electric... | The Zacks Analyst Blog Highlights: Google, T-Mobile... | Altair's CAT-4 150MBPS LTE Chipset Achieves Verizon | Press Release: Chipotle Mexican Grill, Inc. to Announce |

FIG. 18

*(image of News Visualization interface, labeled 1800, with chart region 1810, subject field 1820, and detail marker 1830)*

FIG. 19

SYSTEMS AND METHODS FOR MANAGING PORTFOLIO-RELEVANT NEWS CONTENT

CROSS-REFERENCE TO RELATED APPLICATIONS

This patent application claims the benefit of U.S. Provisional Patent Application No. 61/926,738, filed Jan. 13, 2014, the entirety of which is incorporated herein by reference.

BACKGROUND

This description relates to investment-related news content, and more particularly, to methods and systems for managing news content relevant to an investment portfolio of an investor.

Investors buy and sell financial instruments, such as stocks, bonds, mutual funds, index funds, commodities, and options and derivatives thereof on a regular basis. The instruments owned by an investor at any one time are sometimes referred to as their "investment portfolio."

It is important that the investor stay informed about news that may impact present and projected investments of the investor. Analysis of investment positions includes the analysis of content relevant to present and projected investments ("investment content") including, for example, news content. For at least some investors, the volume of investment content may be significant and may depend upon the number of investments in a particular portfolio and the attention that content-generators (e.g., publications) give to investments in the portfolio. Effective analysis and portfolio-management depends upon effective review of portfolio-relevant investment content. Accordingly, in order to make effective and timely decisions, organizing and prioritizing such investment content with respect to impact on investments may be valuable to an investor.

BRIEF DESCRIPTION OF THE DISCLOSURE

In one aspect, a computer-implemented method for managing portfolio-relevant content is provided. The method is implemented by a content management computer system coupled to a memory. The method includes receiving a set of assets associated with an investor account, transmitting an investment content request for an investment content associated with at least one asset of the set of assets, receiving the investment content including a plurality of investment content items, determining a plurality of content indicators associated with each investment content item, determining a set of relevant investment content including a plurality of display parameters based at least partially on at least a portion of the investment content, the plurality of content indicators, and at least a portion of the set of assets, and providing the set of relevant investment content for display on a user device based on at least a portion of the display parameters.

In another aspect, a content management computer system for managing portfolio-relevant content is provided. The content management computer system includes a memory for storing data and a processor in communication with the memory. The processor is configured to receive a set of assets associated with an investor account, transmit an investment content request for an investment content associated with at least one asset of the set of assets, receive the investment content including a plurality of investment content items, determine a plurality of content indicators associated with each investment content item, determine a set of relevant investment content including a plurality of display parameters based at least partially on at least a portion of the investment content, the plurality of content indicators, and at least a portion of the set of assets, and provide the set of relevant investment content for display on a user device based on at least a portion of the display parameters.

In another aspect, a computer-readable storage device having processor-executable instructions embodied thereon, for managing portfolio-relevant content is provided. When executed by a computing device, the processor-executable instructions cause the computing device to receive a set of assets associated with an investor account, transmit an investment content request for an investment content associated with at least one asset of the set of assets, receive the investment content including a plurality of investment content items, determine a plurality of content indicators associated with each investment content item, determine a set of relevant investment content including a plurality of display parameters based at least partially on at least a portion of the investment content, the plurality of content indicators, and at least a portion of the set of assets, and provide the set of relevant investment content for display on a user device based on at least a portion of the display parameters.

The features, functions, and advantages described herein may be achieved independently in various embodiments of the present disclosure or may be combined in yet other embodiments, further details of which may be seen with reference to the following description and drawings.

BRIEF DESCRIPTION OF THE DRAWINGS

FIG. 6 is a first screenshot of a first set of portfolio-relevant content identified and displayed using the system of FIG. 1;

FIG. 7 is a second screenshot of a second set of portfolio-relevant content identified and displayed using the system of FIG. 1;

FIG. 8 is a third screenshot of a third set of portfolio-relevant content identified and displayed using the system of FIG. 1;

FIG. 9 is a fourth screenshot of a fourth set of portfolio-relevant content identified and displayed using the system of FIG. 1;

FIG. 10 is a fifth screenshot of a fifth set of portfolio-relevant content identified and displayed using the system of FIG. 1;

FIG. 12 is a seventh screenshot of a seventh set of portfolio-relevant content identified and displayed using the system of FIG. 1;

FIG. 13 is an eighth screenshot of an eighth set of portfolio-relevant content identified and displayed using the system of FIG. 1;

FIG. 14 is a ninth screenshot of a ninth set of portfolio-relevant content identified and displayed using the system of FIG. 1;

FIG. 15 is a tenth screenshot of a tenth set of portfolio-relevant content identified and displayed using the system of FIG. 1;

FIG. 16 is an eleventh screenshot of an eleventh set of portfolio-relevant content identified and displayed using the system of FIG. 1;

FIG. 17 is a twelfth screenshot of a twelfth set of portfolio-relevant content identified and displayed using the system of FIG. 1;

FIG. 18 is a thirteenth screenshot of a thirteenth set of portfolio-relevant content identified and displayed using the system of FIG. 1; and FIG. 19 is a fourteenth screenshot of a fourteenth set of portfolio-relevant content identified and displayed using the system of FIG. 1.

Figure 1:
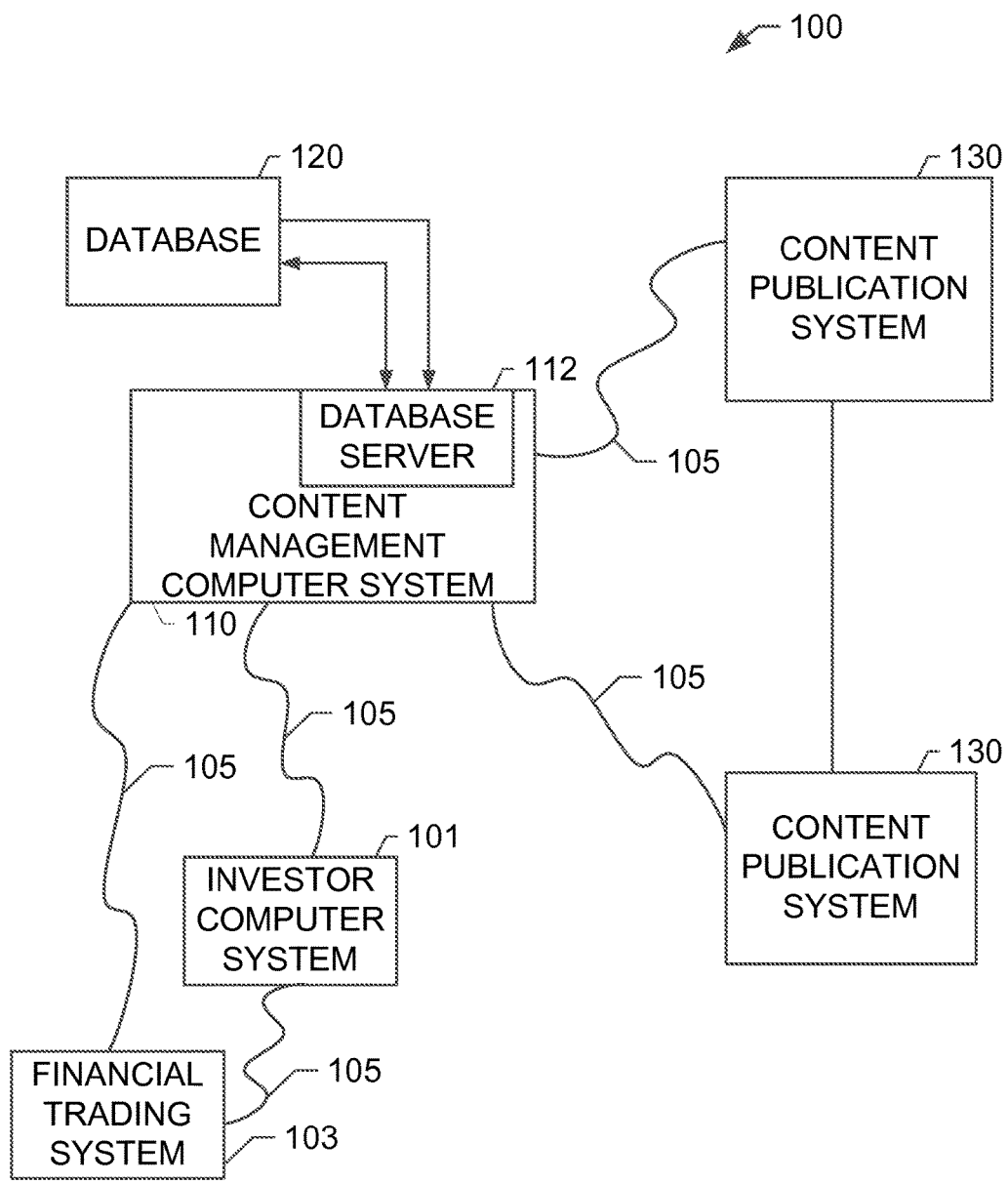
FIG. 1 is a simplified block diagram of an exemplary system used to identify and display portfolio-relevant content including an example content management computer system and a plurality of computer devices in accordance with one example embodiment of the present disclosure.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of implementations refers to the accompanying drawings. The same reference numbers in different drawings may identify the same or similar elements. Also, the following detailed description does not limit the claims.

A particular investor may be interested in reviewing publications from a variety of sources and a variety of types regarding their current, historic, or prospective investments. Due to the significant amount of news content available to investors, identifying highly relevant content may be both important and time-consuming. Accordingly, a system that can identify and display investment content that is relevant and prioritized for an investor based upon the positions of an investor is desirable.

The subject matter described herein relates generally to the identification and display of investment content relevant to the present or projected portfolio of an investor. A set of assets associated with an investor account is received by a content management computer system and used to identify and display relevant investment content to the investor. Specifically, the methods and systems described herein include (i) receiving a set of assets associated with an investor account, including present and projected assets (ii) transmitting an investment content request for an investment content associated with at least one asset of the set of assets, (iii) receiving the investment content including a plurality of investment content items; (iv) determining a plurality of content indicators associated with each investment content item; (v) determining a set of relevant investment content including a plurality of display parameters based at least partially on at least a portion of the investment content, the plurality of content indicators, and at least a portion of the set of assets; and (vi) providing the set of relevant investment content for display on a user device based on at least a portion of the display parameters.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

As described herein, "investment content" refers to any information related to at least one asset that may be beneficial in the evaluation of the asset. Investment content may include, for example and without limitation, text publications, video publications, charts, graphs, reports, and any other content that may be used by an investor to evaluate the asset. At least some examples of investment content may include financial analyses of an asset, market trend analyses related to the asset, and competitive landscape analyses related to an asset. Further, in at least some examples, investment content includes an explicit reference to the asset that may be used to identify the investment content as responsive to a particular asset. In such examples, the investment content may include a stock ticker symbol, a metadata tag, a hashtag, or any other suitable identifier to indicate that the investment content relates to a particular asset.

As described herein, "assets" may refer to any financial instrument that may be exchanged in a market such as, for example, an equity market. Assets may accordingly refer to, for example and without limitation, corporate stock offerings, corporate bond offerings, non-corporate bond offerings, commodities, mutual funds, options and derivatives thereof, and any other suitable assets. As described herein assets may be evaluated using investment content to assist an investor in decisions regarding their position with an asset.

As described herein, a "set of assets" and related terms such as, "inventory of assets", "portfolio of assets", and "portfolio" refers to a group of assets in which an investor currently has a position, formerly had a position, or is prospectively considering a position. An investor may indicate that they are prospectively considering a position by identifying an asset that the investor desires to track using a computer system associated with the content management computer system described herein. As described herein, any asset in which an investor has a position may be considered as part of the set of assets. For example, an investor may hold shares of a first group of assets, have short positions in a second group of assets, have long positions in a third group of assets, and have other options or derivatives in a fourth group of assets. All such groups of assets in this example are considered to be part of the set of assets.

The systems and methods described herein are facilitated by a content management computer system, described in detail below. The content management computer system receives a set of assets associated with an investor account. In the example embodiment, an investor is a user of a financial trading software system and makes financial transactions using the trading software system. The investor has an account, typically a credentialed and secured account, which is associated with the positions of the investor. Accordingly, the financial trading software system stores the current positions of the investor and therefore stores a listing of the set of assets or portfolio of assets associated with the investor account. Further, in some examples an investor may have made previous trades and closed out positions in assets by, for example, selling all shares of a particular stock. In at least some examples, this historical trading data is also included in the listing of the set of assets. In additional examples, the investor may identify assets that the investor is considering for future investment. For example, an investor may use the financial trading software system to "track" or "follow" a particular stock or other asset. In other examples, the investor does not use a financial trading software system and the set of assets is received by the content management computer system through a direct transmission of the set of assets. The set of assets may be stored and received in any suitable manner. In the example embodiment, it is received as a flat file of symbols related to each asset including, for example, stock ticker symbols. The set of assets may additionally include information related to the investment of the assets including, for example, the total investment in each asset by the investor, the dates of transactions related to each asset by the investor, and the total percentage of value of each asset to the investor portfolio.

The content management computer system transmits an investment content request for investment content associated with at least one asset of the set of assets. In some cases, the system transmits a request for all positions ("assets") held by the investor. The investment content request is made to at least one content publication system. In the example embodiment, the investment content request is transmitted to an investment news content server that publishes, tracks, and manages investment content to many assets. The investment content request represents transmitting at least one identifier for at least one asset from the set of assets. In the example embodiment, the investment content request is a listing of stock ticker symbols, index symbols, and other asset identifiers that is sent as an HTTP request to the content publication system. In alternative embodiments, the investment content request is transmitted to a plurality of content publication systems. Content publication systems may include, for example and without limitation, news aggregators, systems associated with particular assets or industries, private financial trading information networks, external data feeds, web services, and content repositories.

The content management computer system receives investment content including a plurality of investment content items. The investment content represents information received from the plurality of content publication systems in response to the investment content request. The investment content items represent individual components of investment content. For example, investment content represents all of the publications, videos, reports, and analyses received in response to a particular investment content request while an individual publication received within the investment content represents an investment content item. Each investment content item may include additional information including that may be used to identify relevant investment content for the investor. Each investment content item may include, for example and without limitation, a publication date and time, a publication author, a publisher, a content categorization, a plurality of asset identifiers, a market impact, and a virality indicator. A content categorization may include a designation of the type of information associated with the publication including, for example, an earnings announcement, a prospective M&A activity, and prospective litigation. Although at least some investment content items include only one asset identifier, other investment content items (e.g., market trend analyses) may include a variety of asset identifiers as the investment content item relates to several assets. A market impact may include an actual or prospective impact of the information within the investment content item on the value of the asset. A virality indicator may include any information related to the frequency with which the investment content item has been distributed or socialized including, for example, numbers of views, numbers of emails, numbers of shares using social networks, numbers of likes on social networks, numbers of links on other investment content sites, numbers of tweets, and any other indicator of the virality of the investment content item.

The content management computer system determines a plurality of content indicators associated with each investment content item. Determining the plurality of content indicators includes extracting information from each investment content item such as the additional information described above. Content indicators may also be referred to as "attributes." Accordingly, the content management computer system may identify additional information related to each investment content item including, without limitation, a publication date and time, a publication author, a subject, a publisher, a content categorization, a plurality of asset identifiers, a market impact, and a virality indicator. In some examples, the content management computer system also determines a content indicator comprising a "sentiment score" to evaluate the characterization of each investment content item. The content management computer system evaluates terms, words, terminology, and phrasing of investment content items to determine whether each investment content item indicates a positive, negative, or neutral characterization for an asset associated with the content item asset identifier. In one example, the content management computer system assigns scores to individual words, terms, phrases, and terminology to indicate whether such language reflects positive, negative, or neutral sentiment. The content management computer system also analyzes investment content items for the presence of such words, terms, phrases, and terminology. The content management computer system determines a combined sentiment score based upon the underlying scores of each analyzed portion of language. In the example embodiment, the combined sentiment score is on a scale from negative ten to positive ten with negative ten reflecting strongly negative sentiment and positive ten reflecting strongly positive sentiment. The combined sentiment score may be provided by the content management computer system along with each associated investment content item for display to an investor on a client device. In alternative embodiments, the content management computer system uses any language processing algorithm or method to analyze each investment content item and determine a combined sentiment score for each investment content item.

The content management computer system processes at least a portion of the investment content and at least a portion of the set of assets to determine a set of relevant investment content. Determining a set of relevant investment content represents identifying a plurality of investment content items from the investment content that is responsive to the set of assets. In one example, investment content items are part of the set of relevant investment content when they include references to at least one asset of the set of assets. Such references to at least one asset may include asset identifiers such as stock ticker symbols.

In a second example, investment content items are part of the set of relevant investment content when they include information that is within a threshold range of timeliness to the investor. In at least one example, the investor transmits an indication or "date filter" to the content management computer system to only view content within a particular period of time. For example, an investor may only wish to see investment content items from the past 30 days. Accordingly, investment content items are determined to be responsive based upon the application of the date filter on the investment content items based upon their publication date and time.

In a third example, investment content items are part of the set of relevant investment content when they include information that is pre-determined to be of interest to the investor based on their source. At least some investors may indicate that they only want information from particular publishers or publication authors and may transmit an indication or "source filter" to the content management computer system to only view content from a particular group of publishers or publication authors. Accordingly, investment content items are determined to be part of the set of relevant investment content for display on a user device based upon their publisher or publication authors.

In a fourth example, investment content items are part of the set of relevant investment content when they include information that is pre-determined to be of interest to the investor based on their categorization. At least some investors may only be interested in viewing particular types of content including, for example, financial reports. An investor may transmit an indication or "content type filter" to the content management computer system to only view content corresponding to a content type. In at least some examples, the content management computer system may additionally categorize the investment content items before making such determination to identify categories associated with the investment content items. The content management computer system may use any suitable method to evaluate the investment content item including natural language processing.

In at least some examples, determining a set of relevant investment content includes determining relevancy of each investment content item. For example, by applying user preferences and processing algorithms, certain investment content items may be determined to be less relevant than other investment content items. In the example embodiment, each investment content item is processed to determine a content relevancy score and an investment relevancy score. A content relevancy score indicates the degree that a particular investment content item includes new information. At least some investment content items are recycled and repurposed and the content relevancy score may be used to determine that some investment content items are less significant due to age or repetition. An investment relevancy score indicates the degree to which a particular investment content item is specific to a particular asset. As described above, at least some investment content items refer to a plurality of assets while other investment content items refer to only one asset. Accordingly, investment content items focused on only one asset may be determined to be more relevant than those focused on a larger group of assets. In such examples, the investment relevancy score will be greater for investment content items focusing on fewer numbers of assets.

The content management computer system also includes a plurality of display parameters with the set of relevant investment content. The display parameters are indications of how the relevant investment content is displayed to the investor. Display parameters may include how to distinguish investment content items from one another. In a first example, display parameters indicate that investment content items are provided on an asset-by-asset basis with greater prominence given to assets associated with newer investment content items. For example, as shown in FIG. 6, assets with newer investment content items are placed on the left-hand portion of the upper navigation bar while assets with older investment content items are placed on the right-hand portion of the navigation bar. Accordingly, by selecting or clicking on a particular asset, investment content items related to the selected asset are displayed.

In a second example, display parameters indicate that investment content items are provided on an asset-by-asset basis with greater prominence given to assets associated with a greater frequency of investment content items. As shown in FIG. 6, assets associated with more investment content items are given comparatively more space on the screen than assets associated with less investment content items. Accordingly, by selecting or clicking on a particular asset, investment content items related to the selected asset are displayed.

In a third example, display parameters indicate that investment content items are provided on an asset-by-asset basis with greater prominence given to assets associated with investment content items of a particular type or impact. For example, assets associated with investment content items that closely precede or follow a significant change in a value of the assets may be given more prominence than assets that do not precede or follow a significant change in a value of the assets. In one example, assets that change in value closely before or after an investment content item beyond a threshold set by the content management computer system or the investor are highlighted or otherwise identified to the investor. In a variation on this example, selecting a particular investment content item associated with an asset whose value changed will cause the display of market performance data during a defined time period before and after the publication of the particular investment content item. In other words, a user can select investment content items and view the impact of the investment content items through market performance data (such as a stock chart) during a period of time before and after the publication of such an investment content item.

In a fourth example, display parameters indicate that investment content items are displayed on an investment content item-by-investment content item basis in a chronological or sequential basis provided that the investment content items are within a defined start time and end time. For example, a user may indicate a start time and end time for viewing investment content items using a date selector or a date "slider" and only view investment content items from within such a date range.

Figure 11:
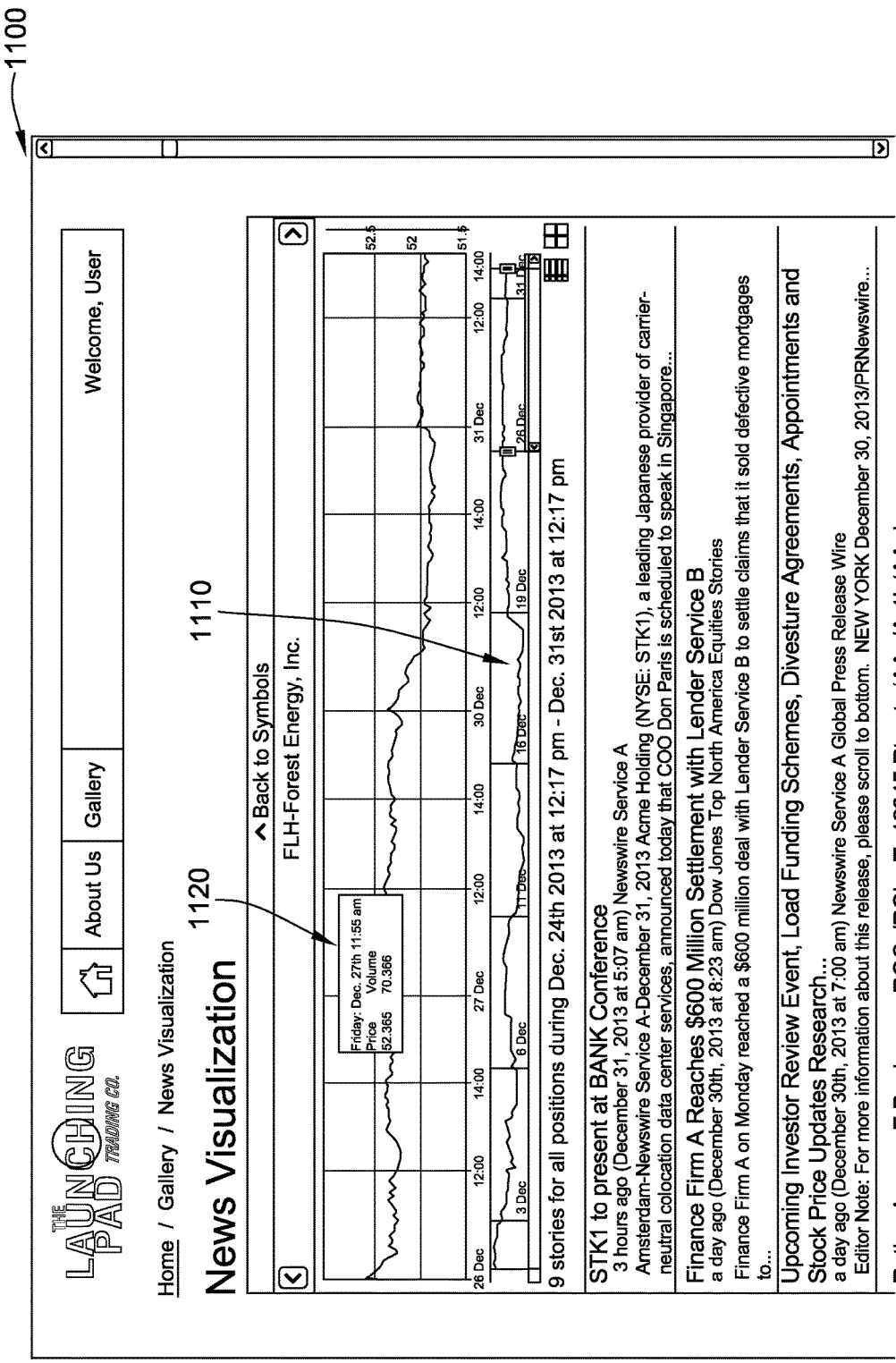
FIG. 11 is a sixth screenshot of a sixth set of portfolio-relevant content identified and displayed using the system of FIG. 1.

In a fifth example, display parameters may indicate that investment content items are displayed only for a particular asset after an investor has selected a particular asset for review. For example, an investor may select a particular asset and only view investment content items for that particular asset. In such examples, the investment content items for the particular asset may be displayed according to other display parameters. In an alternative of this example, display parameters may further indicate that the investment content items be displayed along with a chart showing the performance of the particular asset over the time range as shown in FIG. 11. In this alternative example, the investor may further highlight or select portions of the chart and view investment content items from the time period associated with the selected portions of the chart.

In a sixth example, the display parameters may indicate investment content items are displayed in alternative viewing models such as the card view shown in FIG. 10. In other alternatives of this example, investment content items may be displayed in any suitable format including interactive reports based on other portfolio information. In additional alternatives of this example, other methods of highlighting the age, frequency, and impact of investment content items may be used including graphs of the number of investment content items per asset over time.

In at least some examples, the content management computer system may include defaults to determine display parameters. In the example embodiment, the content management computer system may initially default to include display parameters presenting relevant investment content as displayed in FIG. 6. Accordingly, such defaults include using a treemap to show assets with newer investment content items on the left-hand portion of the treemap and assets with older investment content items on the right-hand portion of the treemap. Such defaults also include presenting a list view of investment content items below the treemap in chronological order. In at least some examples, the defaults may be created or edited by the investor.

Display parameters may additionally be determined by using a set of display settings. The display settings may be received from a computer system associated with the investor. The display settings may include preferences for viewing relevant investment content. For example, the display settings may indicate the range of time over which investment content items may be selected for display. Alternately, the display settings may indicate viewing display formats, preferences for publishers or publication authors, preferences for investment content item categories, preferences for market impacts, and preferences for virality.

The content management computer system also provides the set of relevant investment content for display on a user device based on at least a portion of the display parameters. The set of relevant investment content is provided along with a display order and a display type indicating how and where to present each investment content item. The display order and display type are accordingly based upon the display parameters. In one example, the content management computer system transmits a web response to a computer system associated with the investor including relevant investment content displayed according to display parameters. In at least some examples, the content management computer system is also configured to receive a request from the user device to add investment content items to a reading queue. The reading queue may then be accessed by an investor using an investor computer system wherein the investor can access any investment content items that have been saved to the queue.

In at least one example, the content management computer system also tracks the display of investment content items to investors. More specifically, the content management computer system tracks the amount of times that a link or caption associated with an investment content item (e.g., a snapshot associated with a link) is displayed to an investor and the amount of times that a full investment content item (e.g., an entire article) is displayed to an investor for review. The content management computer system determines a total amount of times that a caption or link for each investment content item is displayed, a click-through rate associated with the link or caption (i.e., a percentage of times that an investor clicked on the caption or link to view a full investment content item), and a total amount of views or reads for each investment content item. The content management computer system associates such values with each investment content item and provides them for display to a client device associated with the investor. Accordingly, the content management computer system may indicate popularity indications associated with each investment content item.

In other examples, the content management computer system is configured to allow a user to define a "watch list" of stocks, commodities, or other assets to track. Accordingly, the user may have a pre-defined view that serves investment content that are relevant to the user based on the watchlist. Further, the content management computer system is configured to identify a "market reaction" and create a "market reaction view" to show the impact of a particular investment content item to at least one asset. Further, the content management computer system allows market reaction views to be compared over time, assets, and sectors so that users may compare reactions to similar stories across assets, time periods, and industries. In at least some examples, the content management computer system may identify similar investment content items based on key characteristics and identify discrepancies between the market reaction to the similar investment content items. The key characteristics may include, for example, subject (e.g., earnings report, M&A activity, change in management), sentiment score, and qualitative metrics (e.g., deal sizes, percentage by which earnings are outperformed or underperformed). Users may sort investment content items based on the market reaction.

The content management computer system is also configured to allow a user to filter news by sector, industry, and region. Further, the content management computer system may identify investment content items that are particularly of value to a user based on the relevancy that similar investment content items have had to asset performance. For example, particular publishers of investment content items may have a generally earlier release cycle than other publishers and may be preferred because they appear before other publishers. In another example, investment content items may be identified because they include recommendations that have higher degrees of accuracy than other investment content items with recommendation. For example, a particular analyst may be identified as particularly strong in a given industry based on historic data that illustrates that the analyst's recommendations were historically correct. The content management computer system may identify such analysts within a sector, for an asset, or generally, and promote such investment content items.

The content management computer system is also configured to identify attributes associated with each investment content item. The attributes may include, for example, publishers, subjects, industries, sectors, themes, regions, sentiment scores, and virality. As described herein, the attributes may be determined using any suitable method including keyword identification, natural language processing, metadata analysis, search and analysis of social media linked to such investment content items, and quantitative analysis of market reaction associated with the investment content items. Further, the content management computer system may provide investment content items with particular attributes based on user search, user filters, user profiles, or any other suitable methodology. For example, users may search or browse for particular subjects associated with their portfolio, a particular asset, or their watch list. Alternately, users may search or browse for investment content items with any particular attribute or attributes that is also associated with their portfolio, a particular asset, or their watch list.

Additionally, the content management computer system may provide indications of the virality of an investment content item and annotating the investment content item. For example, the content management computer system may identify metrics associated with the investment content item including, for example, the amount of total readers of the investment content item, the publication of stories that are similar to the investment content item, the total amount of readers of the similar stories, and social media data associated with the investment content item. Users may rely on such annotations to determine the influence and reliability of the investment content item.

The content management computer system is further configured to receive input from users regarding investment content items. For example, users may annotate investment content items, share investment content items, rate investment content items, and customize investment content items. The content management computer system is also configured to receive ratings of investment content items and serve future investment content items based on the previous ratings. More specifically, the content management computer system may identify stories that are similar to investment content items that were positively rated and serve those stories while not serving stories that are similar to investment content items that were negatively rated.

Further, in at least some examples, the content management computer system may serve investment content items pursuant to the investment goals of a user and user trading history. In a first example, a user may be an aggressive trader that is interested in high risk, high return investments. In such an example, the user may have a relative preference for newer information that may lack the detail of other investment content items. Accordingly, the user may be served new or contrarian information for particular assets so that the user may identify outlier information that may help with an aggressive trading strategy. In a second example, a user may be focused on low risk and low returns and may have a preference for more verified and detailed analysis. Accordingly, the content management computer system may identify the trading goals of a particular user based on a user profile or a direct selection and serve content based on such goals.

Additionally, the content management computer system may serve content based on previous trading history. In one example, the content management computer system may track the history of trades made by the user based on viewing particular types of investment content items. The content management computer system may therefore identify categories of investment content items that are likely to cause the user to make a portfolio change. In such examples, the content management computer system may predict the likelihood that an investor may find an investment content item relevant to a trading decision and serve such investment content items to the user.

In some embodiments, the content management computer system may serve investment content items to the user based on a user profile that is determined based on user selections (e.g., defining watchlists, assets to track, and preferred publishers) and determinations made by the system (e.g., defining stories that are relevant based on the user's investment strategy and trading history.) Accordingly, in such embodiments, the content management computer system may receive user input regarding investment content preferences, receive user input defining a plurality of investment goals, determine investment content analysis profiles by comparing previously served investment content to previous investor trading decisions, and determine an investment content item viewing profile based on the investment content preferences, the investment goals, and the investment content analysis profile. The investment content item viewing profile may be used to facilitate serving investment content items to the user.

The methods and systems described herein may be implemented using computer programming or engineering techniques including computer software, firmware, hardware or any combination or subset thereof, wherein the technical effects may be achieved by performing one of the following steps: (a) receiving a set of assets associated with an investor account, the set of assets including present and projected assets; (b) transmitting an investment content request for an investment content associated with at least one asset of the set of assets; (c) receiving the investment content including a plurality of investment content items; (d) determining a plurality of content indicators associated with each investment content item; (e) determining a set of relevant investment content including a plurality of display parameters based at least partially on at least a portion of the investment content and at least a portion of the set of assets; (f) providing the set of relevant investment content for display on a user device based on at least a portion of the display parameters; (g) receiving a plurality of present assets, historic assets, and assets under evaluation; (h) determining at least one of a date, a content relevancy score, and an investment relevancy score; (i) providing the set of relevant investment content wherein each relevant investment content is associated with a display order and a display type; (j) providing the set of relevant investment content wherein the display order and the display type are determined based upon at least a portion of the display parameters; (k) processing each investment content item to determine at least one of a publication date and time, a publication author, a publisher, a content categorization, a plurality of asset identifiers, a market impact, and a virality indicator; and (l) receiving the investment content from at least one of an external data feed, a web service, and a content repository.

FIG. 1 is a simplified block diagram of an exemplary system 100 used to identify and display portfolio-relevant content including an example content management computer system 110 and a plurality of computer devices 101, 103, and 130, in accordance with one example embodiment of the present disclosure. In the example embodiment, system 100 is used for receiving a set of assets associated with an investor account, transmitting an investment content request for an investment content associated with at least one asset of the set of assets, receiving the investment content including a plurality of investment content items, determining a plurality of content indicators associated with each investment content item, determining a set of relevant investment content including a plurality of display parameters based at least partially on at least a portion of the investment content and at least a portion of the set of assets, and providing the set of relevant investment content for display on a user device based on at least a portion of the display parameters.

More specifically, in the example embodiment, system 100 includes a content management computer system 110, and a plurality of external systems, also referred to as systems 101, 103, and 130, connected to content management computer system 110. More specifically, system 101 is an investor computer system 101 used by an investor (not shown) to access content management computer system 110. Financial trading system 103 is a secondary system in networked communication with content management computer system 110 that is used by an investor using investor computer system 101 to conduct financial investment analysis and transactions. Content publication systems 130 are external systems to which content management computer system 110 transmits investment content requests and from which content management computer system 110 receives investment content. In one embodiment, systems 101, 103, and 130 are computers including web browser, such that content management computer system 110 is accessible to systems 101, 103, and 130 using the Internet. Systems 101, 103, and 130 are interconnected to the Internet through many interfaces including a network 105, such as a local area network (LAN) or a wide area network (WAN), dial-in-connections, cable modems, special high-speed Integrated Services Digital Network (ISDN) lines, and RDT networks. Accordingly, systems 101, 103, and 130 can interact with one another over network 105 as well as with content management computer system 110. Systems 101, 103, and 130 could be any device capable of interconnecting to the Internet including a web-based phone, PDA, or other web-based connectable equipment. In the example embodiment, investor computer system 101 is a laptop computer and financial trading system 103 and content publication systems 130 are servers.

A database server 112 is connected to database 120, which contains information on a variety of matters, as described below in greater detail. In one embodiment, centralized database 120 is stored on content management computer system 110 and can be accessed by potential users at investor computer system 101 by logging onto content management computer system 110 through investor computer system 101. In alternative embodiments, investor computer system 101 accesses financial trading system 103 and receives information from content management computer system 110 through financial trading system 103. In another alternative embodiment, database 120 is stored remotely from content management computer system 110 and may be non-centralized. In additional embodiments, financial trading system 103 and content management computer system 110 are on the same physical or virtual computer and function as one entity.

Database 120 may include a single database having separated sections or partitions, or may include multiple databases, each being separate from each other. Database 120 may store asset information, display parameters, display defaults, display settings, asset history, investment content items, and algorithms and software used to process and display investment content items.

Figure 2:
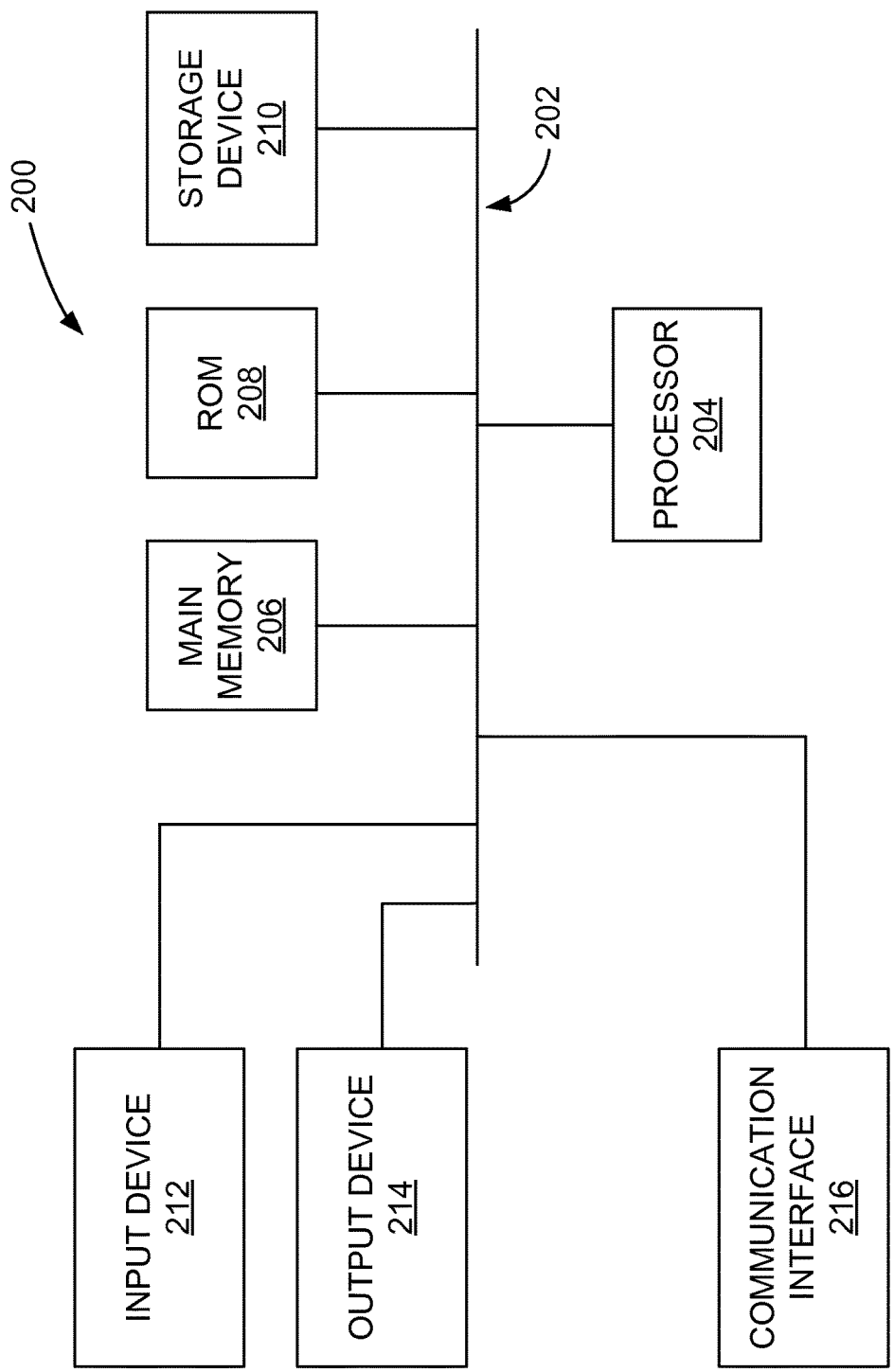
FIG. 2 is a block diagram of a computing device such as the content management computer system used for managing portfolio-relevant content, as shown in the system of FIG. 1.

FIG. 2 is a block diagram of a computing device 200 such as the content management computer system 110 used for managing portfolio-relevant content, as shown in system 100 (shown in FIG. 1). Alternately, computing device 200 may also represent investor computer system 101, financial trading system 103, and content publication system 130 (shown in FIG. 1).

FIG. 2 shows an example of computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be content management computer system 110, investor computer system 101, financial trading system 103, and content publication system 130. Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 105 (shown in FIG. 1).

In examples where computing device 200 is content management computer system 110, processor 204 is specially configured to perform the steps described herein. As described herein, computing device 200 facilitates the identification and display of portfolio-relevant content by content management computer system 110 to an investor using an investor computer system 101. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
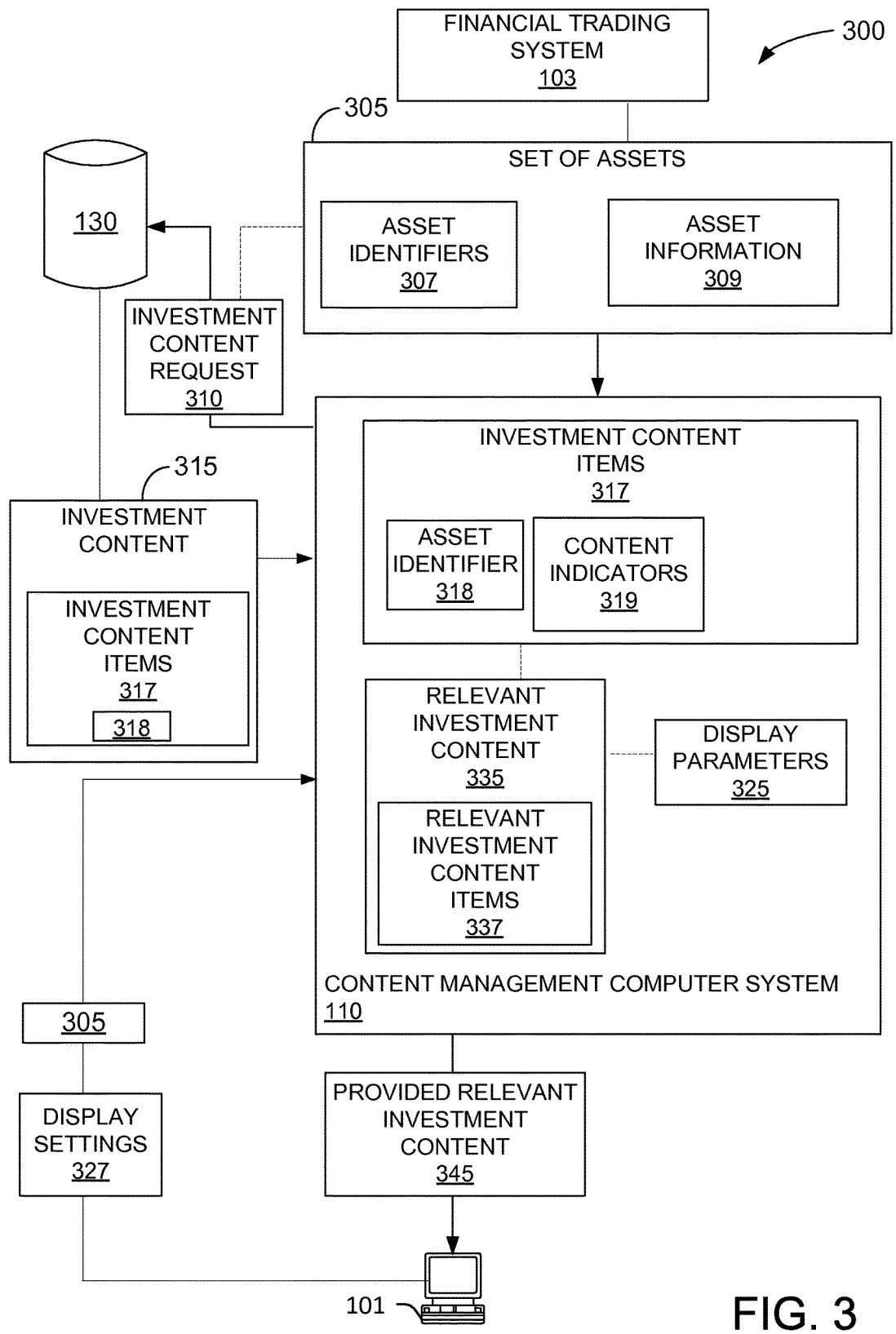
FIG. 3 is an example data flow diagram illustrating the identification and display of portfolio-relevant content by the content management computer system of FIG. 1.

FIG. 3 is an example data flow diagram 300 illustrating the identification and display of portfolio-relevant content by the content management computer system 110. Content management computer system 110 receives a set of assets 305 associated with an investor account. In the example embodiment, an investor is a user of financial trading system 103 and makes financial transactions using financial trading system 103. The investor has an account, typically a credentialed and secured account, which is associated with the positions of the investor. Accordingly, financial trading system 103 stores the current positions of the investor and therefore stores a listing of set of assets 305 associated with the investor account. Further, in some examples an investor may have made previous trades and closed out positions in assets by, for example, selling all shares of a particular stock. In at least some examples, this historical trading data is also included in the listing of the set of assets. In additional examples, the investor may identify assets that the investor is considering for future investment. For example, an investor may use financial trading system 103 to "track" or "follow" a particular stock or other asset. In other examples, the investor does not use a financial trading system 103 and set of assets 305 is received by content management computer system 110 through a direct transmission of set of assets 305 from investor computer system 101 or from any other source. Set of assets 305 also includes at least one asset identifier 307 associated with each asset of set of assets 305. Set of assets 305 may be stored and received in any suitable manner. In the example embodiment, it is received as a flat file of symbols related to each asset including, for example, stock ticker symbols. Set of assets 305 may additionally include asset information 309 related to the investment of the assets including, for example, the total investment in each asset by the investor, the dates of transactions related to each asset by the investor, and the total percentage of value of each asset to the investor portfolio.

Content management computer system 110 transmits an investment content request 310 for investment content associated with at least one asset of set of assets 305. Investment content request 310 is made to at least one content publication system 130. In the example embodiment, investment content request 310 is transmitted to an investment news content server that publishes, tracks, and manages investment content to many assets. Investment content request 310 represents transmitting at least one asset identifier 307 for at least one asset from set of assets 305. In the example embodiment, investment content request 310 is a listing of stock ticker symbols, index symbols, and other asset identifiers that are sent as an HTTP request to content publication system 130. In alternative embodiments, investment content request 310 is transmitted to a plurality of content publication systems 130. Content publication systems 130 may include, for example and without limitation, news aggregators, systems associated with particular assets or industries, private financial trading information networks, external data feeds, web services, and content repositories.

Content management computer system 110 receives investment content 315 including a plurality of investment content items 317. The investment content 315 represents information received from plurality of content publication systems 130 in response to investment content request 310. Investment content items 317 represent individual components of investment content 315. For example, investment content 315 represents all of the publications, videos, reports, and analyses received in response to a particular investment content request 310 while an individual publication received within investment content 315 represents an investment content item 317. Each investment content item 317 may include additional information including that may be used to identify relevant investment content for the investor. Each investment content item 317 may include, for example and without limitation, a publication date and time, a publication author, a publisher, a content categorization, a plurality of asset identifiers, a market impact, and a virality indicator. A content categorization may include a designation of the type of information associated with the publication including, for example, an earnings announcement, a prospective M&A activity, and prospective litigation. Each investment content item 317 includes at least one asset identifier 318. Although at least some investment content items 317 include only one content item asset identifier 318, other investment content items (e.g., market trend analyses) may include a variety of content item asset identifiers 318 as investment content item 317 relates to several assets. A market impact may include an actual or prospective impact of the information within the investment content item 317 on the value of the asset. A virality indicator may include any information related to the frequency with which investment content item 317 has been distributed or socialized including, for example, numbers of views, numbers of emails, numbers of shares using social networks, numbers of likes on social networks, numbers of links on other investment content sites, numbers of tweets, and any other indicator of the virality of investment content item 317.

Content management computer system 110 determines a plurality of content indicators 319 associated with each investment content item 317. Determining the plurality of content indicators 319 includes extracting information from each investment content item 317 such as the additional information described above. Accordingly, content management computer system 110 may identify additional information related to each investment content item 317 as content indicators 319 including, without limitation, a publication date and time, a publication author, a publisher, a content categorization, a plurality of content item asset identifiers 318, a market impact, and a virality indicator. In some examples, content management computer system 110 also determines a content indicator 319 comprising a "sentiment score" to evaluate the characterization of each investment content item 317. Content management computer system 110 evaluates terms, words, terminology, and phrasing of investment content items 317 to determine whether each investment content item 317 indicates a positive, negative, or neutral characterization for an asset associated with content item asset identifier 318. In one example, content management computer system 110 assigns scores to individual words, terms, phrases, and terminology to indicate whether such language reflects positive, negative, or neutral sentiment. Content management computer system 110 also analyzes investment content items 317 for the presence of such words, terms, phrases, and terminology.

Content management computer system 110 determines a combined sentiment score based upon the underlying scores of each analyzed portion of language. In the example embodiment, the combined sentiment score is on a scale from negative ten to positive ten with negative ten reflecting strongly negative sentiment and positive ten reflecting strongly positive sentiment. The combined sentiment score may be provided by content management computer system 110 along with each associated investment content item 317 for display to an investor on a client device. In alternative embodiments, content management computer system 110 uses any language processing algorithm or method to analyze each investment content item 317 and determine a combined sentiment score for each investment content item 317.

Content management computer system 110 processes at least a portion of investment content 315 and at least a portion of set of assets 305 to determine a set of relevant investment content 335. Determining a set of relevant investment content 335 represents identifying a plurality of relevant investment content items 337 from investment content 315 that is responsive to set of assets 305. In one example, investment content items 317 are part of set of relevant investment content 335 when they include references to at least one asset of set of assets 305. Such references to at least one asset may include content item asset identifiers 318 such as stock ticker symbols that correspond to asset identifiers 307 of set of assets 305.

In a second example, investment content items 317 are part of set of relevant investment content 335 when they include information that is within a threshold range of timeliness to the investor. In at least one example, the investor transmits an indication or "date filter" to content management computer system 110 to only view investment content items 317 within a particular period of time. For example, an investor may only wish to see investment content items 317 from the past 30 days. Accordingly, investment content items 317 are determined to be responsive based upon the application of the date filter on investment content items 317 based upon their publication date and time.

In a third example, investment content items 317 are part of set of relevant investment content 335 when they include information that is pre-determined to be of interest to the investor based on their source. At least some investors may indicate that they only want information from particular publishers or publication authors and may transmit an indication or "source filter" to content management computer system 110 to only view investment content items 317 from a particular group of publishers or publication authors. Accordingly, investment content items 317 are determined to be part of set of relevant investment content 335 based upon their publisher or publication authors.

In a fourth example, investment content items 317 are part of set of relevant investment content 335 when they include information that is pre-determined to be of interest to the investor based on their categorization. At least some investors may only be interested in viewing particular types of content including, for example, financial reports. An investor may transmit an indication or "content type filter" to content management computer system 110 to only view investment content items 317 corresponding to a content type. In at least some examples, content management computer system 110 may additionally categorize the investment content items before making such determination to identify categories associated with investment content items 317. Content management computer system 110 may use any suitable method to evaluate each investment content item 317 including natural language processing.

In at least some examples, determining a set of relevant investment content 335 includes determining relevancy of each investment content item. For example, by applying user preferences and processing algorithms, certain investment content items 317 may be determined to be less relevant than other investment content items 317. In the example embodiment, each investment content item 317 is processed to determine a content relevancy score and an investment relevancy score. A content relevancy score indicates the degree that a particular investment content item 317 includes new information. At least some investment content items 317 are recycled and repurposed and the content relevancy score may be used to determine that some investment content items 317 are less significant due to age or repetition. Therefore, recycled or aged investment content items 317 receive a lower content relevancy score than new and unique investment content items 317. An investment relevancy score indicates the degree to which a particular investment content item 317 is specific to a particular asset. As described above, at least some investment content items 317 refer to a plurality of assets while other investment content items refer to only one asset. Accordingly, investment content items 317 focused on only one asset may be determined to be more relevant than those focused on a larger group of assets. In such examples, the investment relevancy score will be greater for investment content items 317 focusing on fewer numbers of assets.

Content management computer system 110 also includes a plurality of display parameters 325 with set of relevant investment content 335. Display parameters 325 are indications of how relevant investment content 335 is displayed to the investor. Display parameters 325 may include how to distinguish investment content items 317 from one another. In a first example, display parameters 325 indicate that investment content items 317 are provided on an asset-by-asset basis with greater prominence given to assets associated with newer investment content items 317. For example, as shown in FIG. 6, assets with newer investment content items 317 are placed on the left-hand portion of the upper navigation bar while assets with older investment content items 317 are placed on the right-hand portion of the navigation bar. Accordingly, by selecting or clicking on a particular asset, investment content items 317 related to the selected asset are displayed.

In a second example, display parameters 325 indicate that investment content items 317 are provided on an asset-by-asset basis with greater prominence given to assets associated with a greater frequency of investment content items 317. As shown in FIG. 6, assets associated with more investment content items 317 are given comparatively more space on the screen than assets associated with less investment content items 317. Accordingly, by selecting or clicking on a particular asset, investment content items 317 related to the selected asset are displayed.

In a third example, display parameters 325 indicate that investment content items 317 are provided on an asset-by-asset basis with greater prominence given to assets associated with investment content items 317 of a particular type or impact. For example, assets associated with investment content items 317 that closely precede or follow a significant change in a value of the assets may be given more prominence than assets that do not precede or follow a significant change in a value of the assets. In one example, assets that change in value closely before or after an investment content item 317 beyond a threshold set by content management computer system 110 or the investor are highlighted or otherwise identified to the investor. In a variation on this example, selecting a particular investment content item 317 associated with an asset whose value changed will cause the display of market performance data during a defined time period before and after the publication of the particular investment content item 317. In other words, a user can select investment content items 317 and view the impact of the investment content items 317 through market performance data (such as a stock chart) during a period of time before and after the publication of such an investment content item 317. In a further variation, such market performance data for a particular asset may be queried and displayed for any investment content item 317 associated with the particular asset during a defined period before and after the publication of the investment content item 317. The defined period may be defined by a user such as an investor or defaulted by the content management computer system 110.

In a fourth example, display parameters 325 indicate that investment content items 317 are displayed on an investment content item-by-investment content item 317 basis in a chronological or sequential basis provided that the investment content items 317 are within a defined start time and end time. For example, a user may indicate a start time and end time for viewing investment content items 317 using a date selector or a date "slider" and only view investment content items 317 from within such a date range.

In a fifth example, display parameters 325 may indicate that investment content items 317 are displayed only for a particular asset after an investor has selected a particular asset for review. For example, an investor may select a particular asset and only view investment content items 317 for that particular asset. In such examples, the investment content items 317 for the particular asset may be displayed according to other display parameters 325. In an alternative of this example, display parameters 325 may further indicate that investment content items 317 are displayed along with a chart showing the performance of the particular asset over the time range as shown in FIG. 11. In this alternative example, the investor may further highlight or select portions of the chart and view investment content items 317 from the time period associated with the selected portions of the chart.

In a sixth example, the display parameters 325 may indicate investment content items 317 are displayed in alternative viewing models such as the card view shown in FIG. 10. In other alternatives of this example, investment content items 317 may be displayed in any suitable format including interactive reports based on other portfolio information. In additional alternatives of this example, other methods of highlighting the age, frequency, and impact of investment content items 317 may be used including graphs of the number of investment content items 317 per asset over time.

In at least some examples, content management computer system 110 may include defaults to determine display parameters 325. In the example embodiment, content management computer system 110 may initially default to include display parameters 325 presenting relevant investment content 335 as displayed in FIG. 6. Accordingly, such defaults include using a treemap to show assets with newer investment content items 317 on the left-hand portion of the treemap and assets with older investment content items 317 on the right-hand portion of the treemap. Such defaults also include presenting a list view of investment content items 317 below the treemap in chronological order. In at least some examples, the defaults may be created or edited by the investor.

Display parameters 325 may additionally be determined by using a set of display settings 327. Display settings 327 may be received from investor computer system 101. Display settings 327 may include preferences for viewing relevant investment content 335. For example, display settings 327 may indicate the range of time over which investment content items 317 may be selected for display. Alternately, display settings 327 may indicate viewing display formats, preferences for publishers or publication authors, preferences for investment content item categories, preferences for market impacts, and preferences for virality.

Content management computer system 110 also provides the set of relevant investment content 335 based on at least a portion of the display parameters 325. Set of relevant investment content 335 is provided as provided relevant investment content 345 along with a display order and a display type indicating how and where to present each investment content item 317. The display order and display type are accordingly based upon display parameters 325. In one example, content management computer system 110 transmits a web response to a content management computer system 110 associated with the investor including relevant investment content 335 displayed according to display parameters 325. In at least some examples, content management computer system 110 is also configured to receive a request from the user device to add investment content items 317 to a reading queue. The reading queue is stored to memory 206 (shown in FIG. 2) in content management computer system 110 for later retrieval by the investor. The reading queue represents references to any selected investment content items 317. The reading queue may then be accessed by an investor using an investor computer system wherein the investor can access any investment content items that have been saved to the queue.

In at least one example, content management computer system 110 also tracks the display of investment content items 317 to investors. More specifically, content management computer system 110 tracks the amount of times that a link or caption associated with an investment content item 317 (e.g., a snapshot associated with a link) is displayed to an investor and the amount of times that a full investment content item 317 (e.g., an entire article) is displayed to an investor for review. Content management computer system 110 determines a total amount of times that a caption or link for each investment content item 317 is displayed, a click-through rate associated with the link or caption (i.e., a percentage of times that an investor clicked on the caption or link to view a full investment content item 317), and a total amount of views or reads for each investment content item 317. Content management computer system 110 associates such values with each investment content item 317 and provides them for display to a client device associated with the investor. Accordingly, content management computer system 110 may indicate popularity indications associated with each investment content item 317.

Figure 4:
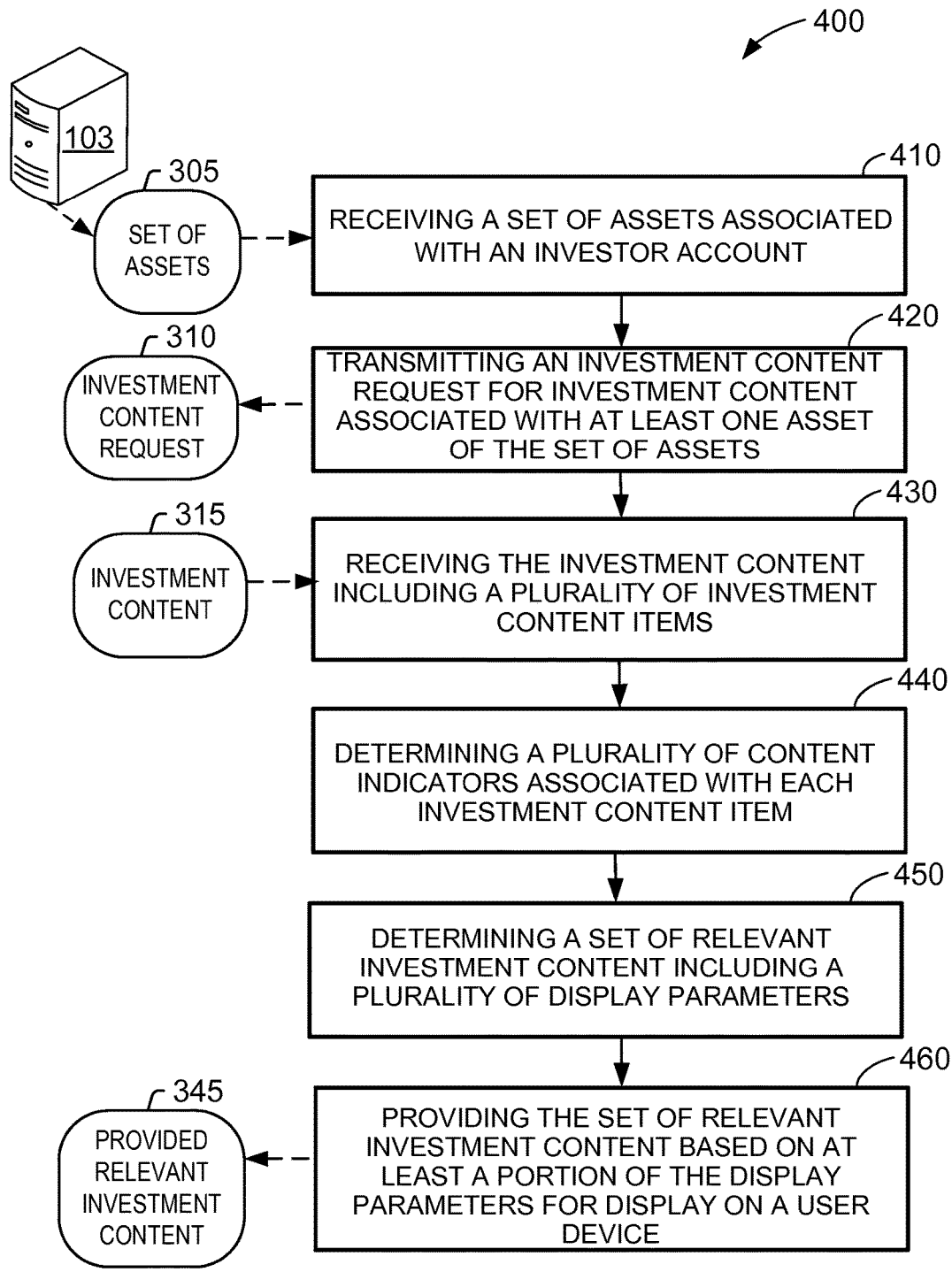
FIG. 4 is an example method for managing portfolio-relevant content using the system of FIG. 1.

FIG. 4 is an example method 400 for managing portfolio-relevant content using system 100 (shown in FIG. 1) implemented by content management computer system 110. Content management computer system 110 receives 410 a set of assets associated with an investor account. Receiving 410 represents receiving a set of assets 305 associated with an investor account from any source. In the example embodiment, content management computer system 110 receives 410 from financial trading system 103.

Content management computer system 110 transmits 420 an investment content request for investment content associated with at least one asset of the set of assets. Transmitting 420 represents sending investment content request 310 to at least one content publication system 130 wherein investment content request is associated with at least one asset of set of assets 305.

Content management computer system 110 receives 430 investment content including a plurality of investment content items. Receiving 430 represents receiving investment content 315 including investment content items 317 (shown in FIG. 3).

Content management computer system 110 determines 440 a plurality of content indicators associated with each investment content item. Determining 440 represents identifying content indicators 319 (shown in FIG. 3) based upon investment content items 317.

Content management computer system 110 determines 450 a set of relevant investment content including a plurality of display parameters based at least partially on at least a portion of the investment content and at least a portion of the set of assets. Determining 450 represents determining relevant investment content 335 (shown in FIG. 3) and display parameters 325 (shown in FIG. 3) associated with each investment content item 317 of relevant investment content 335.

Content management computer system 110 provides 460 the set of relevant investment content for display on a user device based on at least a portion of the display parameters. Providing 460 represents providing provided relevant investment content 345 to a computer device associated with the investor such as investor computer system 101 (shown in FIG. 1).

Figure 5:
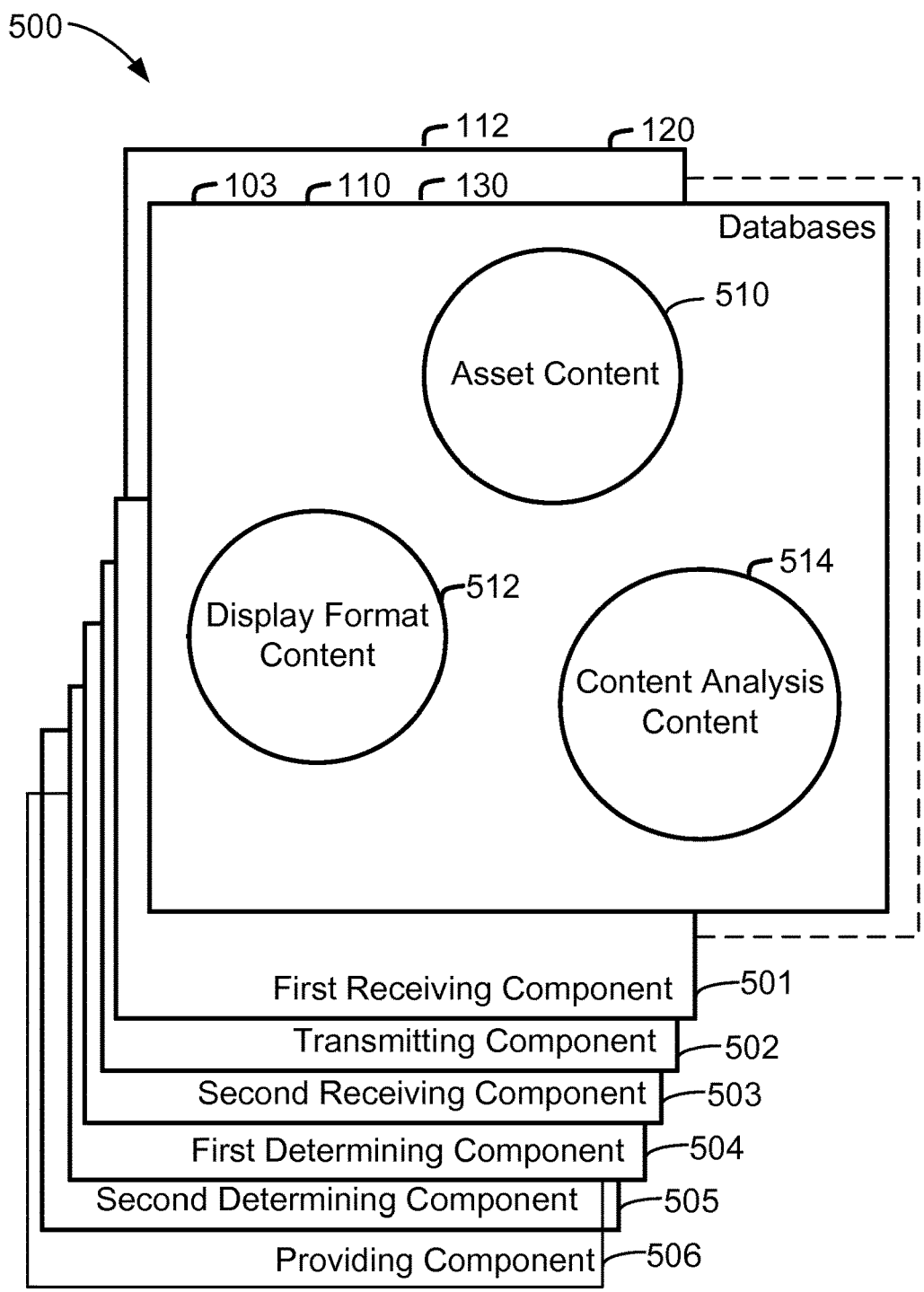
FIG. 5 is a diagram of components of one or more example computing devices that may be used in the system shown in FIG. 1.

FIG. 5 is a diagram 500 of components of one or more example computing device such as content management computer system 110 (shown in FIG. 1) that may be used in system 100 (shown in FIG. 1).

For example, one or more of computing devices 200 may form financial trading system 103, content management computer system 110, and content publication system 130 (all shown in FIG. 1). FIG. 6 further shows a configuration of databases 112 and 120 (shown in FIG. 1). Databases 112 and 120 are coupled to several separate components within financial trading system 103, content management computer system 110, and content publication system 130, which perform specific tasks.

Content management computer system 110 includes a first receiving component 501 for receiving a set of assets associated with an investor account from any source, a transmitting component 502 for transmitting an investment content request to at least one content publication system wherein investment content request is associated with at least one asset of set of assets, a second receiving component 503 for receiving investment content including investment content items, a first determining component 504 for determining content indicators based upon investment content items, a second determining component 505 for determining a set of relevant investment content including a plurality of display parameters based at least partially on at least a portion of the investment content and at least a portion of the set of assets, and a providing component 506 for providing relevant investment content to a computer device associated with the investor such as investor computer system.

In an exemplary embodiment, databases 112 and 120 are divided into a plurality of sections, including but not limited to, an asset content section 510, a display format and style content section 512, and a content analysis and processing section 514. These sections within database 112 and 120 are interconnected to update and retrieve the information as required.

FIG. 6 is a first screenshot 600 of a first set of portfolio-relevant content identified and displayed using content management computer system 110 (shown in FIG. 1). First screenshot 600 indicates a plurality of investment content items 317 selected based upon set of assets 305 (shown in FIG. 3) and displayed based upon display parameters 325 (shown in FIG. 3). In first screenshot 600, indicators 610 for investment content items 317 are shown at the top of first screenshot 600 in a "treemap" view. Indicators 610 are arranged to identify assets 620 associated with greater volumes of investment content items 317 and newer investment content items 317. In first screenshot 610, assets 620 are sorted from those associated with the most recent investment content items 317 on the left and those associated with the oldest investment content items 317 to the right and assets 620 with no investment content items 317 on the far right. Further, assets 620 associated with greater numbers of investment content items 317 are shown with larger indicators 610 than those with lesser numbers of investment content items 317. For example, asset associated with "FLH" has more recent investment content items 317 than "AEW" but fewer total investment content items 317 than "AEW".

Figure 7:
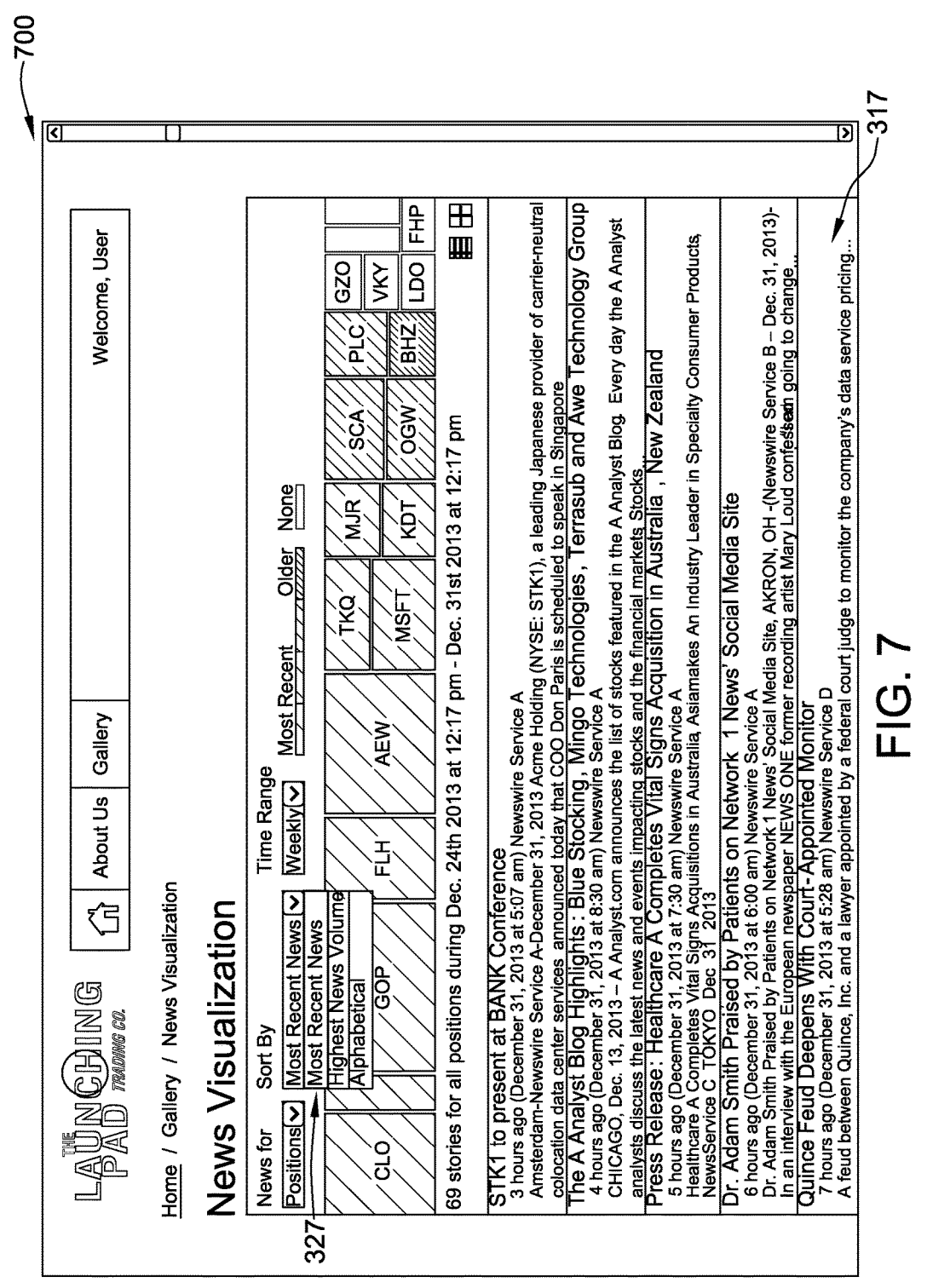

FIG. 7 is a second screenshot 700 of a second set of portfolio-relevant content identified and displayed using content management computer system 110 (shown in FIG. 1). Second screenshot 700 illustrates that investment content items 317 may be displayed differently by using different display parameters 325 (shown in FIG. 3) and further by altering display settings 327 (shown in FIG. 3). Display settings 327 in second screenshot 700 may be adjusted to sort investment content items by "Most Recent News", "Highest News Volume", and "Alphabetical." In other examples any other suitable method of sorting may be used for investment content items 317.

Figure 8:
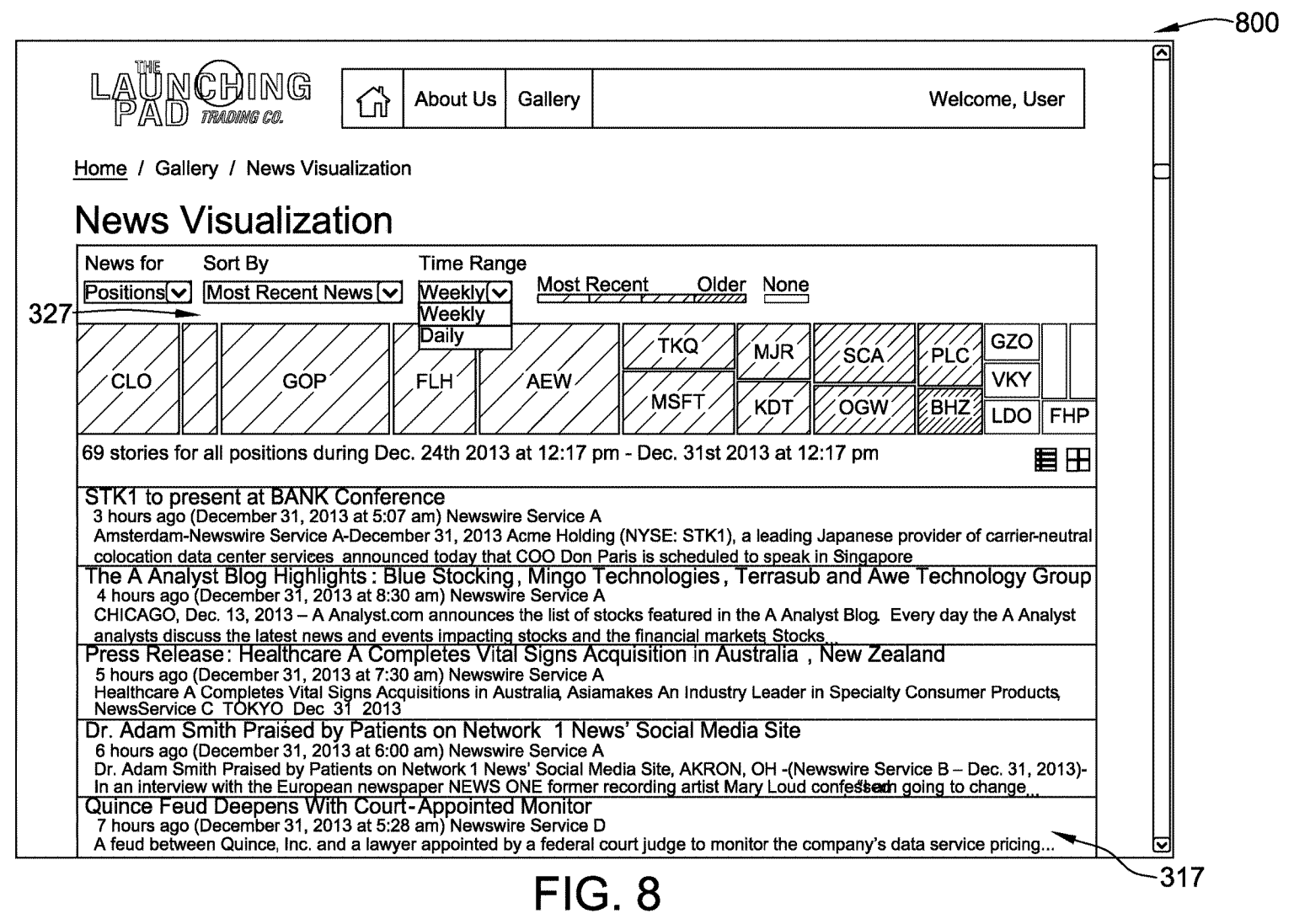

FIG. 8 is a third screenshot 800 of a third set of portfolio-relevant content identified and displayed using content management computer system 110 (shown in FIG. 1). Third screenshot 800 shows an alternative method of displaying investment content items 317 differently by using different display parameters 325 (shown in FIG. 3) and further by altering display settings 327 (shown in FIG. 3). Display settings 327 in third screenshot 800 may be adjusted to filter the range of time from which investment content items 317 are shown. The time range may be adjusted to "Weekly" or "Daily". Alternately, explicit dates may be provided as display settings 327 to throttle the display of investment content items 317.

FIG. 9 is a fourth screenshot 900 of a fourth set of portfolio-relevant content identified and displayed using content management computer system 110 (shown in FIG. 1). Fourth screenshot 900 indicates that display parameters 325 (shown in FIG. 3) may allow for a snapshot or full version of a particular investment content item 317 to be displayed when a user makes a selection. In the example embodiment, a user rolls over or highlights a selected investment content item 910 and content management computer system 110 causes story 920 to be displayed.

FIG. 10 is a fifth screenshot 1000 of a fifth set of portfolio-relevant content identified and displayed using content management computer system 110 (shown in FIG. 1). Fifth screenshot 1000 indicates that display parameters 325 (shown in FIG. 3) may allow for investment content items 317 to be displayed in an alternative view known as a "card view". Fifth screenshot 1000 is an example and additional alternative methods of displaying investment content items 317 may be used.

FIG. 11 is a sixth screenshot 1100 of a sixth set of portfolio-relevant content identified and displayed using content management computer system 110 (shown in FIG. 1). Sixth screenshot 1100 indicates that display parameters 325 (shown in FIG. 3) may allow for investment content items 317 to be displayed in conjunction with stock chart 1110. In the example embodiment, when a user highlights a portion of stock chart 1110, the investment content items 317 will change according to the time period indicated. For example, if a user selects the date of December $27^{th}$, the performance for the stock will appear as stock performance 1120 and investment content items 317 will be updated to show investment content items 317 associated with the selected stock ("FLH") and from December $27^{th}$.

Figure 12:
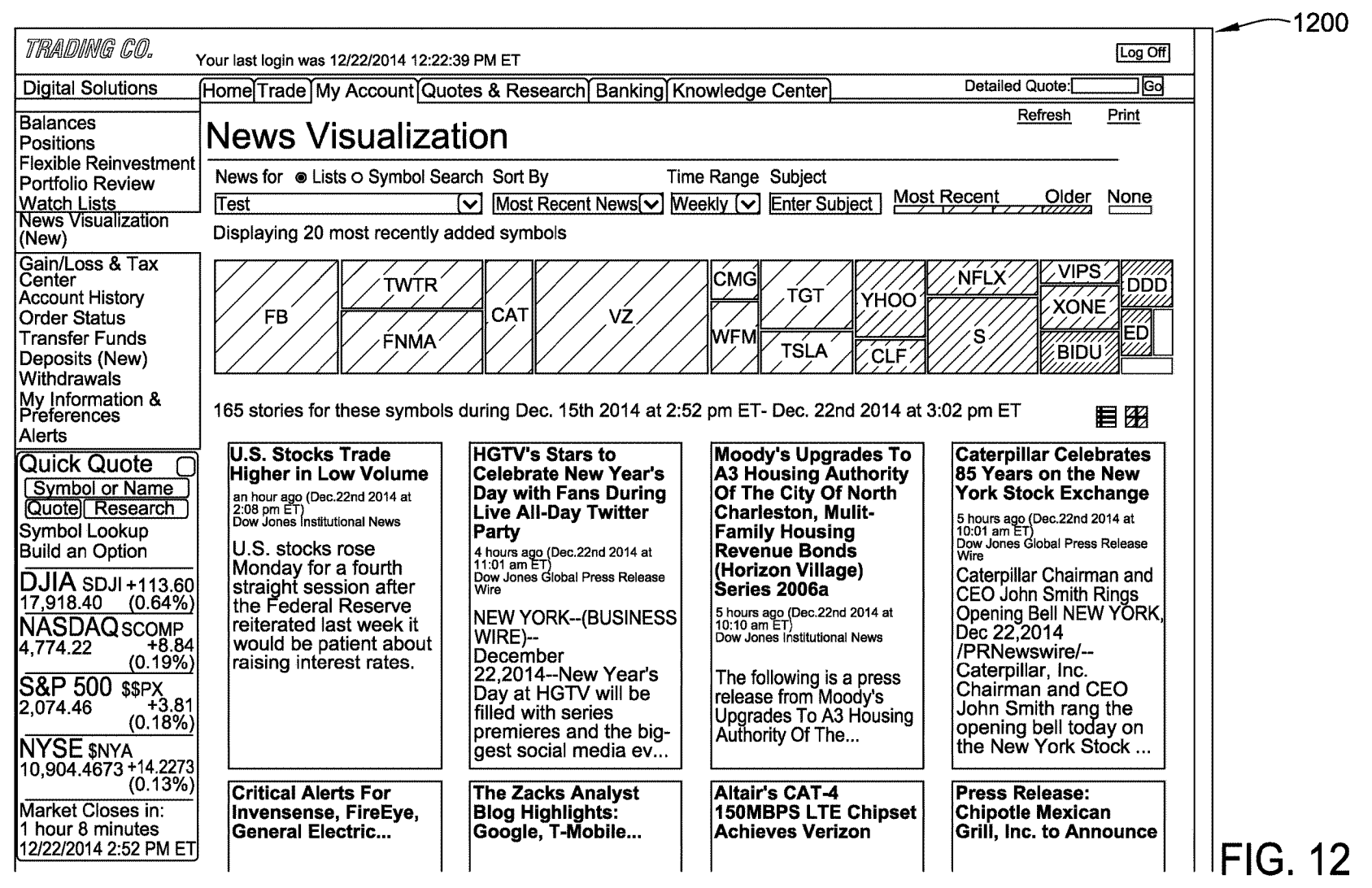

FIG. 12 is a seventh screenshot 1200 of a seventh portfolio-relevant content identified and displayed using content management computer system 110 (shown in FIG. 1). Seventh screenshot 1200 indicates that display parameters 325 (shown in FIG. 3) may allow for investment content items 317 to be displayed in a second, alternative "card view" from the "card view" shown in FIG. 10.

Figure 14:
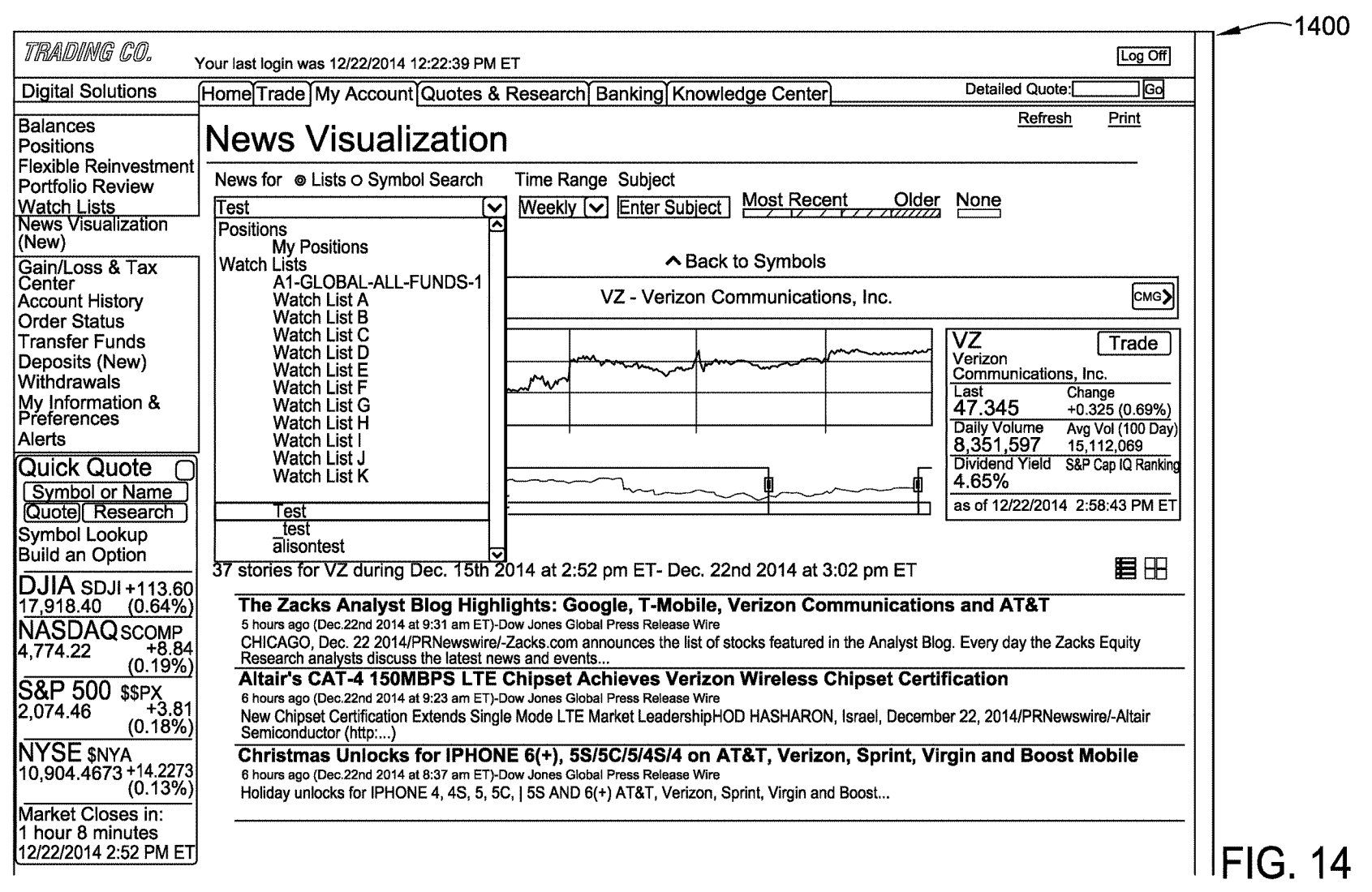
Figure 15:
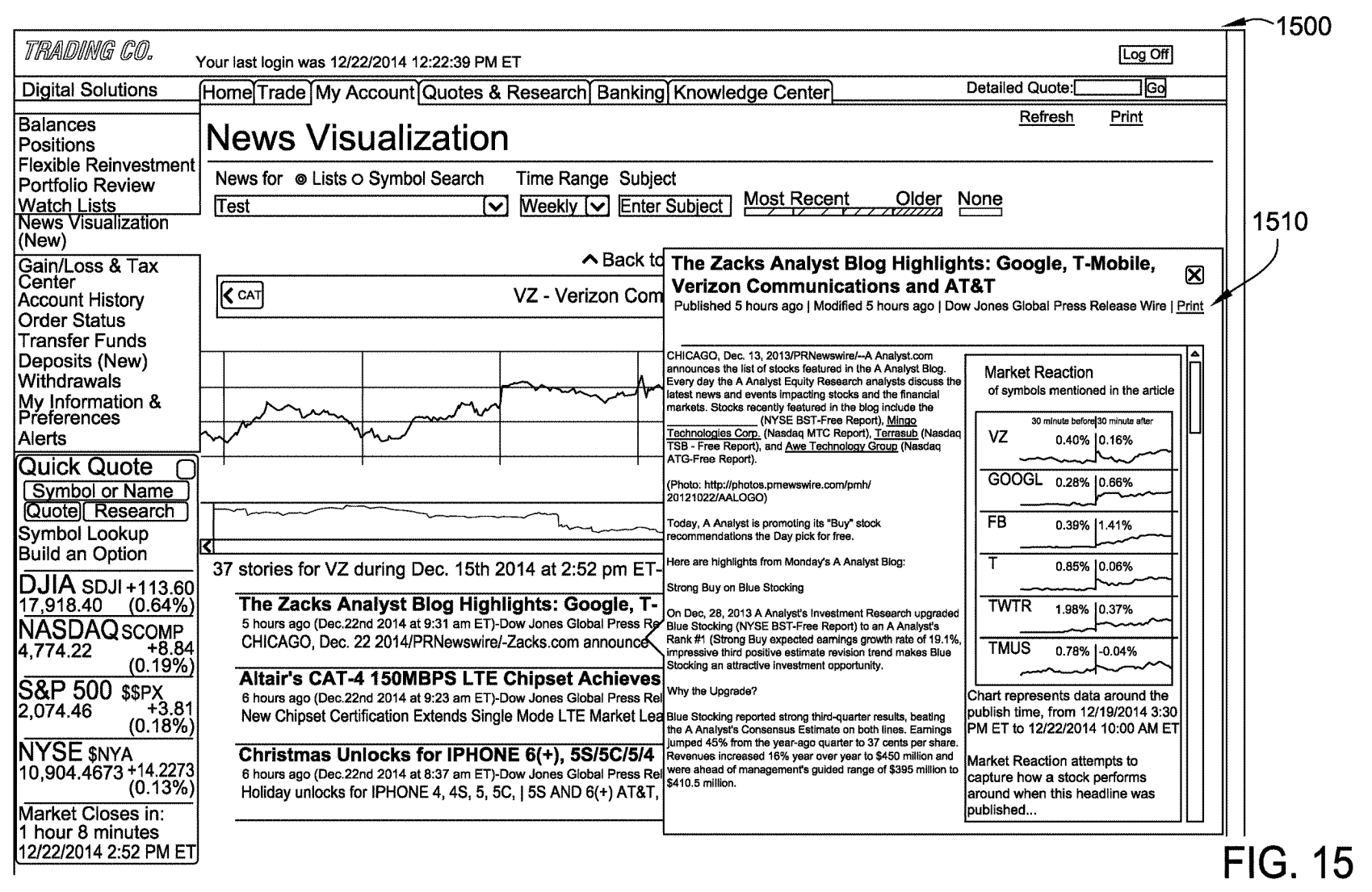

FIG. 13 is an eighth screenshot 1300 of an eighth set of portfolio-relevant content identified and displayed using content management computer system 110 (shown in FIG. 1). Eighth screenshot 1300 indicates that display parameters 325 (shown in FIG. 3) may allow for investment content items 317 to be displayed in a "list view" displaying investment content items 317 that are associated with a "watch list". The "watch list" may be defined by a user to include specific assets, sectors, or topics to monitor. Eighth screenshot 1300 may also be referred to as a "treemap" format. As indicated in the dropdown labeled "Sort By", the treemap may be sorted based on a variety of criteria including by time, news volume, and alphabetical order. Similarly, as indicated by "Time Range", investment content items 317 may be provided over particular time periods (e.g., a daily range, a weekly range, or a monthly range.) Referring to FIG. 14, users may select from multiple potential watchlists (using selection box 1410) to provide investment content items 317 in the treemap format. Referring to FIG. 15, the content management computer system 110 is configured to display detailed content when a user rolls over a particular treemap tile. As shown in FIG. 15, a user has rolled over a first investment content item 317 and caused a detailed content of a news article 1510 to be displayed.

Figure 16:
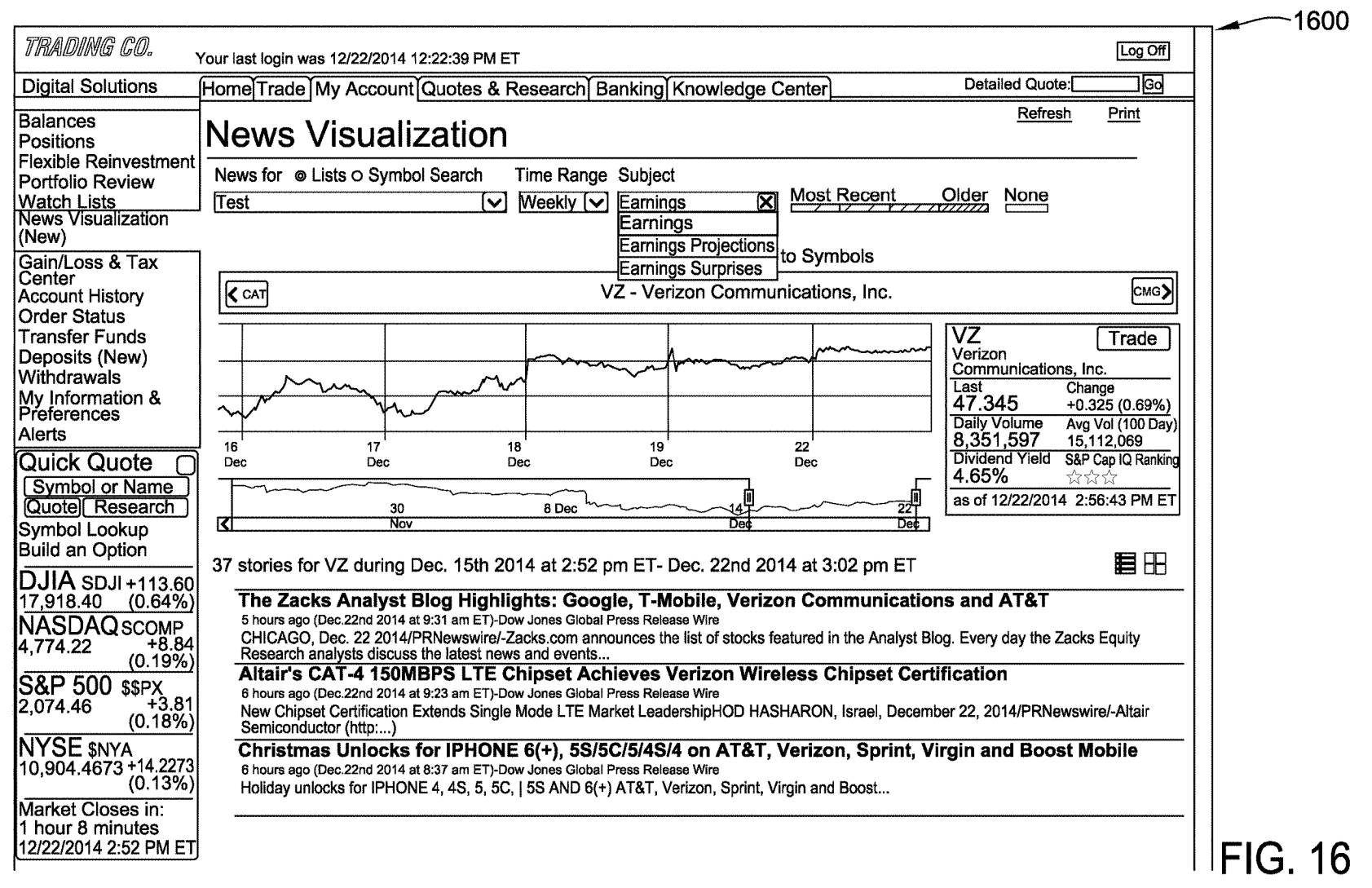

FIG. 16 is an eleventh screenshot 1600 of an eleventh set of portfolio-relevant content identified and displayed using content management computer system 110 (shown in FIG. 1). Specifically, screenshot 1600 indicates that investment content items 317 may be selected or displayed based on a user subject selection. Accordingly, if a user only wishes to see earnings reports, the display may show only earnings reports.

FIG. 17 is a twelfth screenshot 1700 of a twelfth set of portfolio-relevant content identified and displayed using content management computer system 110 (shown in FIG. 1). In screenshot 1700, content management computer system 110 provides a "symbol search" allowing a user to select investment content items 317 for a particular stock symbol, index symbol, or other asset symbol. By selecting stocks with symbol search, a user may also define a watchlist.

Figure 18:
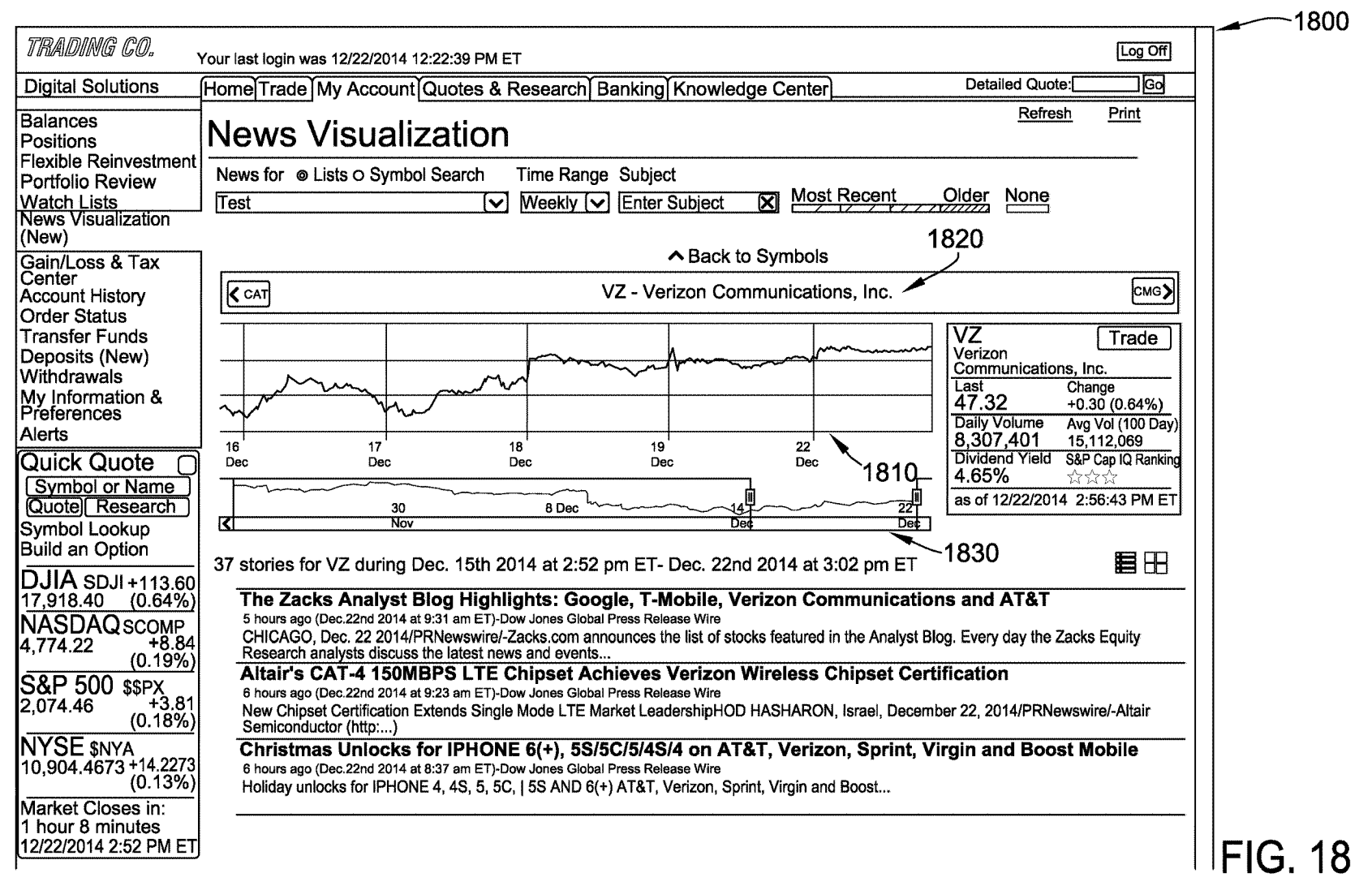

FIG. 18 is a thirteenth screenshot 1800 of a thirteenth set of portfolio-relevant content identified and displayed using content management computer system 110 (shown in FIG.

1). In screenshot 1800, content management computer system 100 provides interactive price chart 1810 for a particular symbol 1820. The interactive price chart 1810 may be adjusted to show prices over narrower or broader timeframes by adjusting time range 1830. Further, as the time range 1830 is adjusted, not only does the interactive price chart 1810 respond, but investment content items 317 also change in response. Further, content management computer system 110 is configured to provide even more granular investment content items 317 if a user highlights, rolls over, or selects a particular time period within interactive price chart 1810.

Further, content management computer system 110 is configured to allow a user to select a particular investment content item 317 (e.g., a news story) and provide a "market reaction view" including interactive price chart 1810. In some examples, the market reaction view may also include analysis of previous similar stories for the asset to allow a user to identify whether the market reaction is similar to previous market reactions to similar stories. For example, content management computer system 110 may identify earnings reports for a particular asset that are similar to previous earnings reports (e.g., earnings reports that exceed projections by the same amount) and indicate whether the present market response is similar to previous market responses. In one example, content management computer system 110 may provide overlapping or co-presented charts of market responses to allow a user to determine whether the market is responding to a story in a similar way as previously. In a second example, content management computer system 110 may identify a discrepancy in the change of value of an asset between two similar investment content items 317.

Additionally, content management computer system is configured to overlay indicators on interactive price chart 1810 to indicate that investment content item 317 is associated with a particular time period of interactive price chart 1810.

In further examples, content management computer system 110 is configured to provide multiple interactive price charts 1810 when a user selects a particular investment content item 317 so that a user may see the reaction of multiple assets to the investment content item 317. In some examples, the multiple interactive price charts 1810 may be identified because they are in a watchlist. In other examples, the multiple interactive price charts 1810 may be identified because they are directly named or referenced in the investment content item 317.

Figure 19:
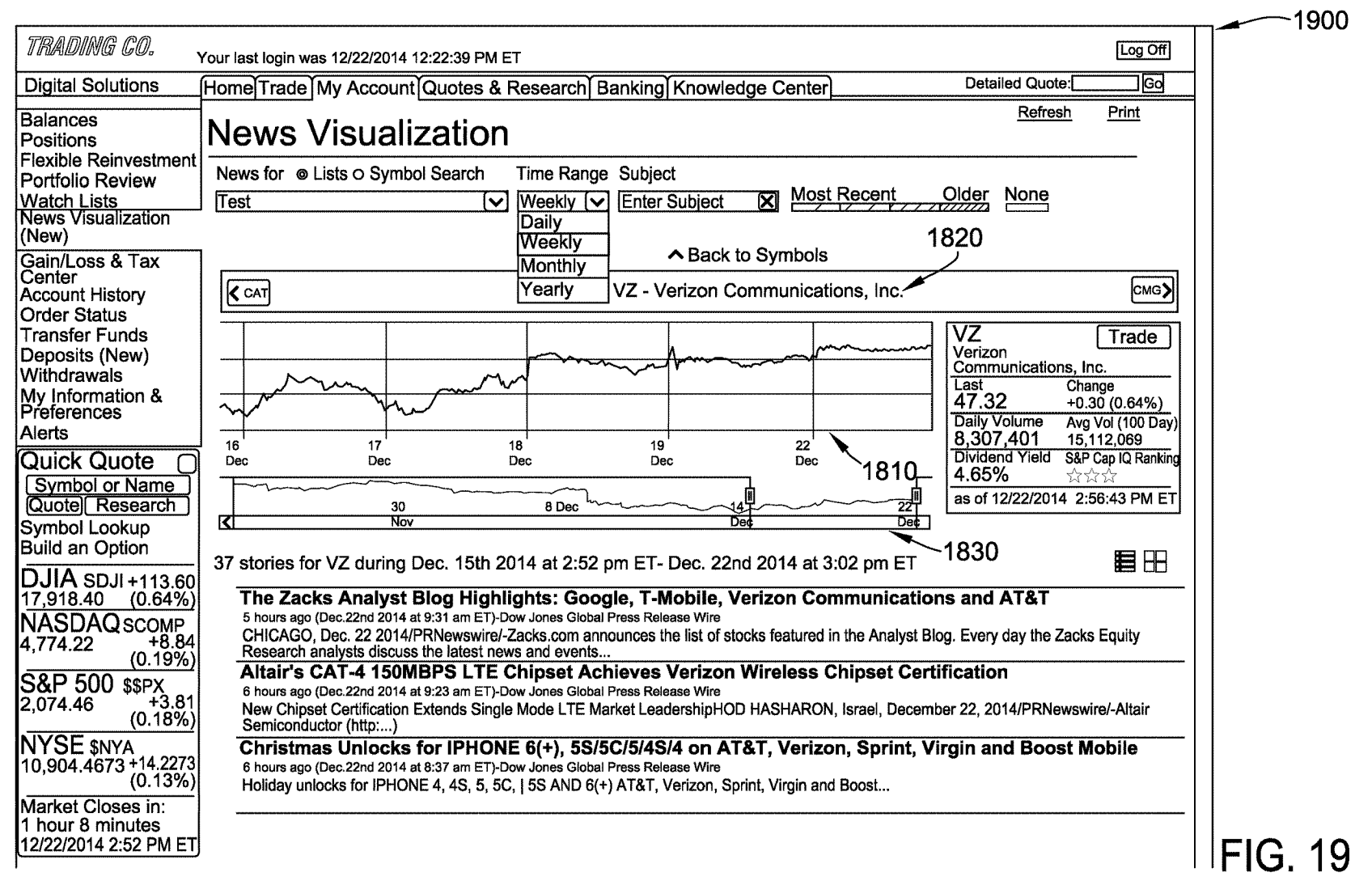

FIG. 19 is a fourteenth screenshot 1900 of a fourteenth set of portfolio-relevant content identified and displayed using content management computer system 110 (shown in FIG. 1). Specifically, screenshot 1900 illustrates that time range 1830 may be adjusted for interactive price chart 1810.

Content management computer system 110 is further configured to allow a user to save settings for the display of investment content items 317, print or save individual investment content items 317, and access trading and research based on a particular investment content item 317. In one example, a user may click on an interactive price chart 1810 (shown in FIG. 18) and immediately define a trade including making a market order, a limit order, a put, a call, and any other suitable asset trade.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A method implemented by a content management computer system in communication with a local computing device over an electronic computer network, the method comprising:
    identifying a first user associated with the local computing device;
    receiving asset data representing a set of assets associated with an investor account of the first user, wherein the asset data includes a set of asset identifiers;
    transmitting an investment content request for investment content associated with at least one asset of the set of assets;
    receiving the investment content, wherein the investment content includes a plurality of investment content items;
    determining a plurality of content indicators associated with each investment content item of the plurality of investment content items;
    determining, by the content management computer system, a first set of filtered investment content items based on a plurality of filters, wherein the plurality of filters includes filters that operate based on the investment content, the plurality of content indicators, at least a portion of the set of assets, at least one display parameter, and a viewing profile associated with the first user;
    generating a user interface panel, wherein:
        the user interface panel includes a plurality of shapes,
        each shape of the plurality of shapes corresponds to an asset of the set of assets, and
        generating the user interface panel includes:
            for each shape of the plurality of shapes
    (i) determining a number of content items of the plurality of investment content items that are associated with the asset that corresponds to the shape, (ii) determining an age associated with the number of content items, (iii) setting a size of the shape based on the number of content items, and (iv) selectively inserting an asset identifier of the set of asset identifiers that is associated with the asset that corresponds to the shape, and
        arranging the plurality of shapes within the user interface panel based on the age of the number of content items associated with each shape; and
        generating a user interface to be displayed on a display unit of the local computing device, wherein the user interface includes:
            the user interface panel, and
            at least one of the first set of filtered investment content items in a column below the user interface panel; and
        in response to receiving, from the first user via the local computing device, a selection of one of the plurality of shapes included in the user interface panel:
            determining a second set of filtered investment content items based on the first set of filtered investment content items and the selected shape by retaining investment content items of the first set of filtered investment content items that are relevant to the asset that corresponds to the selected shape; and
            updating the user interface to display at least one of the second set of filtered investment content items in a column below the user interface panel.

2. The method of claim 1, wherein the set of assets associated with the investment account of the first user includes present assets, historic assets, and assets under evaluation.

3. The method of claim 1, wherein determining the first set of filtered investment content items includes determining at least one of a date, a content relevancy score, and an investment relevancy score.

4. The method of claim 1, wherein each filtered investment content item is associated with a display order and a display type based upon the at least one display parameter.

5. The method of claim 4, wherein the viewing profile is determined by comparing previously served investment content with previous investor trading decisions.

6. The method of claim 1, wherein determining the plurality of content indicators associated with each investment content item of the plurality of investment content items includes processing each investment content item to determine a market impact indicating an actual or prospective impact of information within each investment content item on a value of at least one asset of the set of assets.

7. The method of claim 1, wherein receiving the investment content includes receiving the investment content from at least one of an external data feed, a web service, and a content repository.

8. A content management computer system comprising a memory for storing data and a processor in communication with the memory, the processor programmed to:
    identify a first user associated with a local computer device in communication with the content management computer system over an electronic network;
    receive asset data representing a set of assets associated with an investor account of the first user, wherein the asset data includes a set of asset identifiers;
    transmit an investment content request for an investment content associated with at least one asset of the set of assets;
    receive the investment content, wherein the investment content includes a plurality of investment content items;
    determine a plurality of content indicators associated with each investment content item of the plurality of investment content items;
    determine a first set of filtered investment content items based on a plurality of filters, wherein the plurality of filters includes filters that operate based on the investment content, the plurality of content indicators, at least a portion of the set of assets, at least one display parameter, and a viewing profile associated with the first user;
    generate a user interface panel, wherein:
        the user interface panel includes a plurality of shapes,
        each shape of the plurality of shapes corresponds to an asset of the set of assets, and
        generating the user interface panel includes:
            for each shape of the plurality of shapes
    (i) determining a number of content items of the plurality of investment content items that are associated with the asset that corresponds to the shape, (ii) determining an age associated with the number of content items, (iii) setting a size of the shape based on the number of content items, and (iv) selectively inserting an asset identifier of the set of asset identifiers that is associated with the asset that corresponds to the shape, and
arranging the plurality of shapes within the user interface panel based on the age of the number of content items associated with each shape; and
generate a user interface to be displayed on a display unit of the local computing device, wherein the user interface includes:
the user interface panel, and
at least one of the first set of filtered investment content items in a column below the user interface panel; and
in response to receiving, from the first user via the local computing device, a selection of one of the plurality of shapes included in the user interface panel:
determine a second set of filtered investment content items based on the first set of filtered investment content items and the selected shape by retaining investment content items of the first set of filtered investment content items that are relevant to the asset that corresponds to the selected shape; and
update the user interface to display at least one of the second set of filtered investment content items in a column below the user interface panel.

9. The content management computer system of claim 8, wherein the set of assets associated with the investment account of the first user includes present assets, historic assets, and assets under evaluation.

10. The content management computer system of claim 8, wherein the processor is further programmed to:
determine, for each investment content item of the plurality of investment content items, at least one of a date, a content relevancy score, and an investment relevancy score.

11. The content management computer system of claim 8, wherein the processor is further programmed to:
provide the second set of filtered investment content items such that each displayed investment content item is associated with a display order and a display type based upon the at least one display parameter.

12. The content management computer system of claim 11, wherein the processor is further programmed to:
determine the viewing profile from a comparison of previously served investment content with previous investor trading decisions.

13. The content management computer system of claim 8, wherein the processor is further programmed to:
process each investment content item of the plurality of investment content items to determine a market impact indicating an actual or prospective impact of information within each investment content item on a value of at least one asset of the set of assets.

14. The content management computer system of claim 8, wherein the processor is further programmed to:
receive the investment content from at least one of an external data feed, a web service, and a content repository.

15. A non-transitory computer-readable storage medium comprising processor-executable instructions that, when executed by a processor of a computer having a memory, cause the computer to:
identify a first user associated with a local computer device in communication with a content management computer system over an electronic network;
receive asset data representing a set of assets associated with an investor account of the first user, wherein the asset data includes a set of asset identifiers;
transmit an investment content request for an investment content associated with at least one asset of the set of assets;
receive the investment content, wherein the investment content includes a plurality of investment content items;
determine a plurality of content indicators associated with each investment content item of the plurality of investment content items;
determine a first set of filtered investment content items based on a plurality of filters, wherein the plurality of filters includes filters that operate based on the investment content, the plurality of content indicators, at least a portion of the set of assets, at least one display parameter, and a viewing profile associated with the first user;
generate a user interface panel, wherein:
the user interface panel includes a plurality of shapes, each shape of the plurality of shapes corresponds to an asset of the set of assets, and
generating the user interface panel includes:
for each shape of the plurality of shapes
(i) determining a number of content items of the plurality of investment content items that are associated with the asset that corresponds to the shape, (ii) determining an age associated with the number of content items, (iii) setting a size of the shape based on the number of content items, and (iv) selectively inserting an asset identifier of the set of asset identifiers that is associated with the asset that corresponds to the shape, and
arranging the plurality of shapes within the user interface panel based on the age of the number of content items associated with each shape;
generate a user interface to be displayed on a display unit of the local computing device, wherein the user interface includes:
the user interface panel, and
at least one of the first set of filtered investment content items in a column below the user interface panel; and
in response to receiving, from the first user via the local computing device, a selection of one of the plurality of shapes included in the user interface panel:
determine a second set of filtered investment content items based on the first set of filtered investment content items and the selected shape by retaining investment content items of the first set of filtered investment content items that are relevant to the asset that corresponds to the selected shape; and
update the user interface to display at least one of the second set of filtered investment content items in a column below the user interface panel.

16. The non-transitory computer-readable storage medium of claim 15, wherein the processor-executable instructions cause the computer to:
determine, for each investment content item of the plurality of investment content items, at least one of a date, a content relevancy score, and an investment relevancy score.

17. The non-transitory computer-readable storage medium of claim 15, wherein the processor-executable instructions cause the computer to:

associate each investment content item of the second set of filtered investment content items with a display order and a display type based upon the at least one display parameter.

18. The non-transitory computer-readable storage medium of claim 17, wherein the processor-executable instructions cause the computer to:
determine the viewing profile from a comparison of previously served investment content with previous investor trading decisions.

19. The non-transitory computer-readable storage medium of claim 15, wherein the processor-executable instructions cause the computer to:
process each investment content item of the plurality of investment content items to determine a market impact indicating an actual or prospective impact of information within each investment content item on a value of at least one asset of the set of assets.

* * * * *